(12) United States Patent
Tabuchi

(10) Patent No.: US 11,412,144 B2
(45) Date of Patent: Aug. 9, 2022

(54) METHODS AND APPARATUS FOR OPTICAL IMAGE STABILIZATION

(71) Applicant: SEMICONDUCTOR COMPONENTS INDUSTRIES, LLC, Phoenix, AZ (US)

(72) Inventor: Yoshihisa Tabuchi, Gifu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/301,264

(22) Filed: Mar. 30, 2021

(65) Prior Publication Data
US 2022/0191397 A1 Jun. 16, 2022

Related U.S. Application Data

(60) Provisional application No. 63/199,256, filed on Dec. 16, 2020.

(51) Int. Cl.
H04N 5/232 (2006.01)
G03B 5/00 (2021.01)

(52) U.S. Cl.
CPC .......... H04N 5/23287 (2013.01); G03B 5/00 (2013.01); H04N 5/23258 (2013.01); G03B 2205/0007 (2013.01); G03B 2205/0053 (2013.01)

(58) Field of Classification Search
CPC .......... H04N 5/23258; H04N 5/23287; H04N 5/2254; H04N 5/23212; H02K 41/0356; G02B 7/09; G02B 7/28; G02B 7/028; G02B 7/08; G03B 5/00; G03B 2205/0007; G03B 2205/0053

USPC ..................................................... 348/208.11
See application file for complete search history.

(56) References Cited

U.S. PATENT DOCUMENTS

| 6,047,132 | A | 4/2000 | Maeda | |
|---|---|---|---|---|
| 8,009,971 | B2* | 8/2011 | Koo | H04N 5/23287 348/208.4 |
| 10,484,583 | B2* | 11/2019 | Gregory | H04N 5/2257 |
| 10,616,466 | B2* | 4/2020 | Tabuchi | G02B 7/08 |
| 10,996,484 | B2* | 5/2021 | Hu | G02B 27/646 |
| 11,263,166 | B2* | 3/2022 | Kim | G06F 13/1605 |
| 2008/0152332 | A1* | 6/2008 | Koo | H04N 5/23258 348/E5.046 |
| 2009/0219402 | A1* | 9/2009 | Schneider | H04N 5/2328 348/208.7 |
| 2010/0053344 | A1 | 3/2010 | Tsukamoto | |
| 2013/0287381 | A1 | 10/2013 | Tsukamoto | |
| 2017/0041552 | A1* | 2/2017 | Calpe Maravilla | G03B 3/10 |

(Continued)

FOREIGN PATENT DOCUMENTS

JP 2013257519 A 12/2013

Primary Examiner — Pritham D Prabhakher
(74) Attorney, Agent, or Firm — Dickinson Wright PLLC

(57) ABSTRACT

Various embodiments of the present technology may provide methods and apparatus for optical image stabilization. The methods and apparatus for optical image stabilization may be integrated within an electronic device. An exemplary system may include an actuator control circuit responsive to a sensor and a feedback signal from an actuator. The actuator control circuit may be configured to calibrate a gain applied to a drive signal based on a relative position between the actuator and the sensor and an output signal generated by the actuator control circuit.

20 Claims, 12 Drawing Sheets

(56) References Cited

U.S. PATENT DOCUMENTS

2017/0302853 A1\* 10/2017 Shigeoka .............. H04N 5/243
2018/0295286 A1\* 10/2018 Maede ............... H04N 5/23261
2018/0343393 A1\* 11/2018 Maede ............... H04N 5/23254
2018/0376068 A1\* 12/2018 Shimatani .......... H04N 5/23287
2020/0120283 A1\* 4/2020 Min ..................... G02B 13/001
2020/0288061 A1\* 9/2020 Grenet ............... H04N 5/23258

\* cited by examiner

METHODS AND APPARATUS FOR OPTICAL IMAGE STABILIZATION

CROSS-REFERENCE TO RELATED APPLICATION

This application claims the benefit of U.S. Provisional Patent Application Ser. No. 63/199,256, filed on Dec. 16, 2020, the contents of which are incorporated by reference.

BACKGROUND OF THE TECHNOLOGY

Many electronic devices have an imaging system integrated within them, and in some cases, the electronic device may be turned and/or rotated for the purpose of a desired image capture. In many cases, the imaging system may be controlled by an optical imaging stabilization (OIS) system. In particular, the OIS system may operate to stabilize various components of the imaging system, such as a lens, and to correct for involuntary movements of the electronic device caused by external disturbances, for example movements caused by a shaking hand (hand tremors). However, various components of the imaging system, such as sensors, actuators, etc. may be separated from each other by a distance, which may cause communication delays between the various components. As a result, there may be a sizeable difference between the acceleration signal detected by the imaging system and the acceleration signal applied to the lens, which may influence the optical image stabilization system and/or a position of the lens. In addition, offset errors and/or biases may be introduced into the various components of the system, which may further influence the optical image stabilization system and/or the position of the lens. As a result, given a particular position instruction (code) associated with a respective target position and drive signal, the magnitude of the drive signal needed to move the lens to the target position may be different than the one specified by the position instruction value (code).

SUMMARY OF THE TECHNOLOGY

Various embodiments of the present technology may provide methods and apparatus for optical image stabilization. The methods and apparatus for optical image stabilization may be integrated within an electronic device. An exemplary system may include an actuator control circuit responsive to a sensor and a feedback signal from an actuator. The actuator control circuit may be configured to calibrate a gain applied to a drive signal based on a relative position between the actuator and the sensor and an output signal generated by the actuator control circuit.

BRIEF DESCRIPTION OF THE FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various acceleration filters, acceleration sensors, actuators, actuator control circuits, gain circuits, attenuators, calculation circuits, circuitry, coils, controllers, current sources, drivers, filters, gyro filters, gyro sensors, image sensors, lens, logic gates, magnets, processors, sensors, semiconductor devices, such as transistors, capacitors, and the like, signal generators, substrates, and voltage sources, which may carry out a variety of functions. In addition, the present technology may be integrated in any number of electronic systems, such as imaging systems, automotive, aviation, "smart devices," portables, medical, scientific, surveillance, and consumer electronics, and the systems described are merely exemplary applications for the technology.

The present technology may be used in conjunction with any position sensor circuit that may be influenced by centripetal force, tangential force, gravity, and sensitivity compensation, such as a position sensor used for motor control and a sensor used for detecting the orientation of a cell phone. Further, the present technology may employ any number of conventional techniques for capturing image data, converting data signals, filtering data signals, generating drive signals, and the like.

Methods and apparatus for optical image stabilization according to various aspects of the present technology may be integrated within any suitable electronic device or system, such as imaging systems, "smart devices," wearables, consumer electronics, and the like. According to various embodiments, the present technology may determine one or more orientations of the electronic device, generate one or more orientation signals, and apply one or more appropriate gain values to the one or more orientation signals to generate a drive signal.

Figure 1:
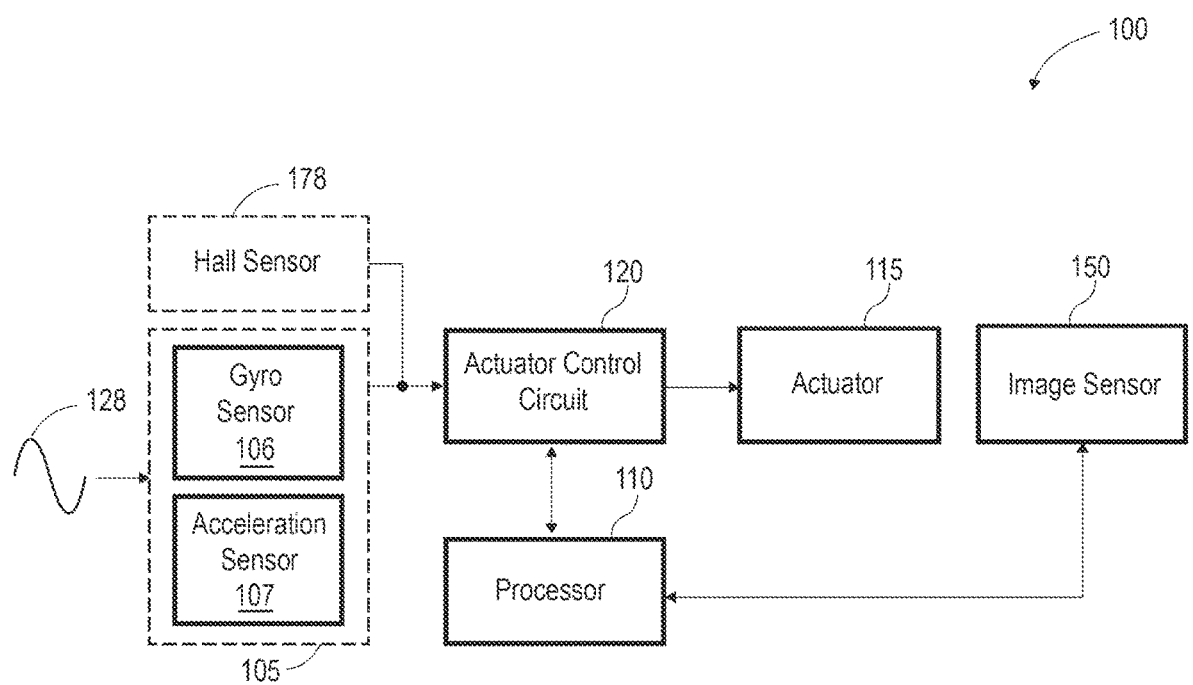
FIG. 1 is a block diagram of an optical image stabilization system in accordance with an exemplary embodiment of the present technology.
Figure 2:
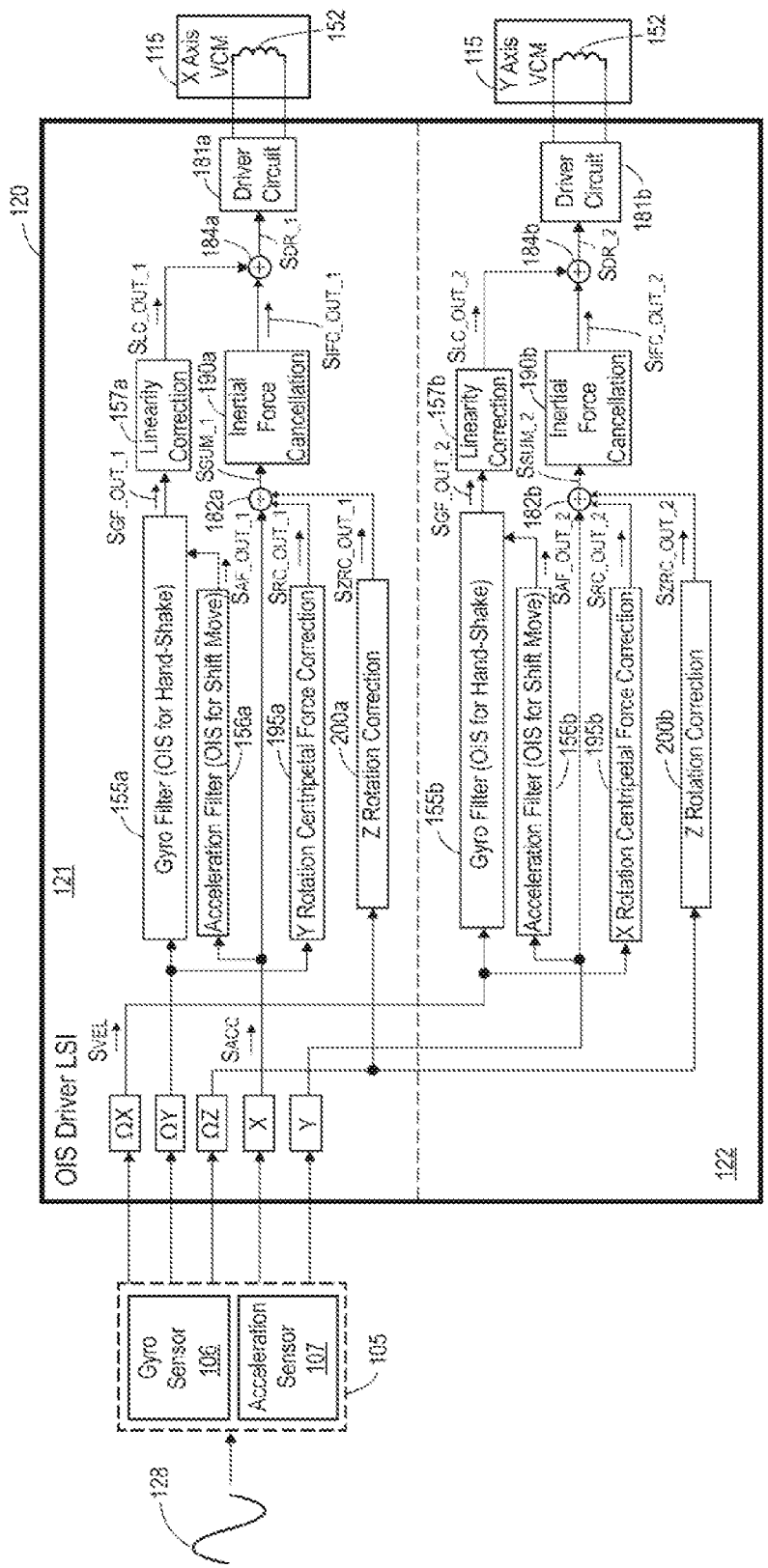
FIG. 2 is a block diagram of an open-loop actuator control circuit in accordance with an exemplary embodiment of the present technology.
Figure 3:
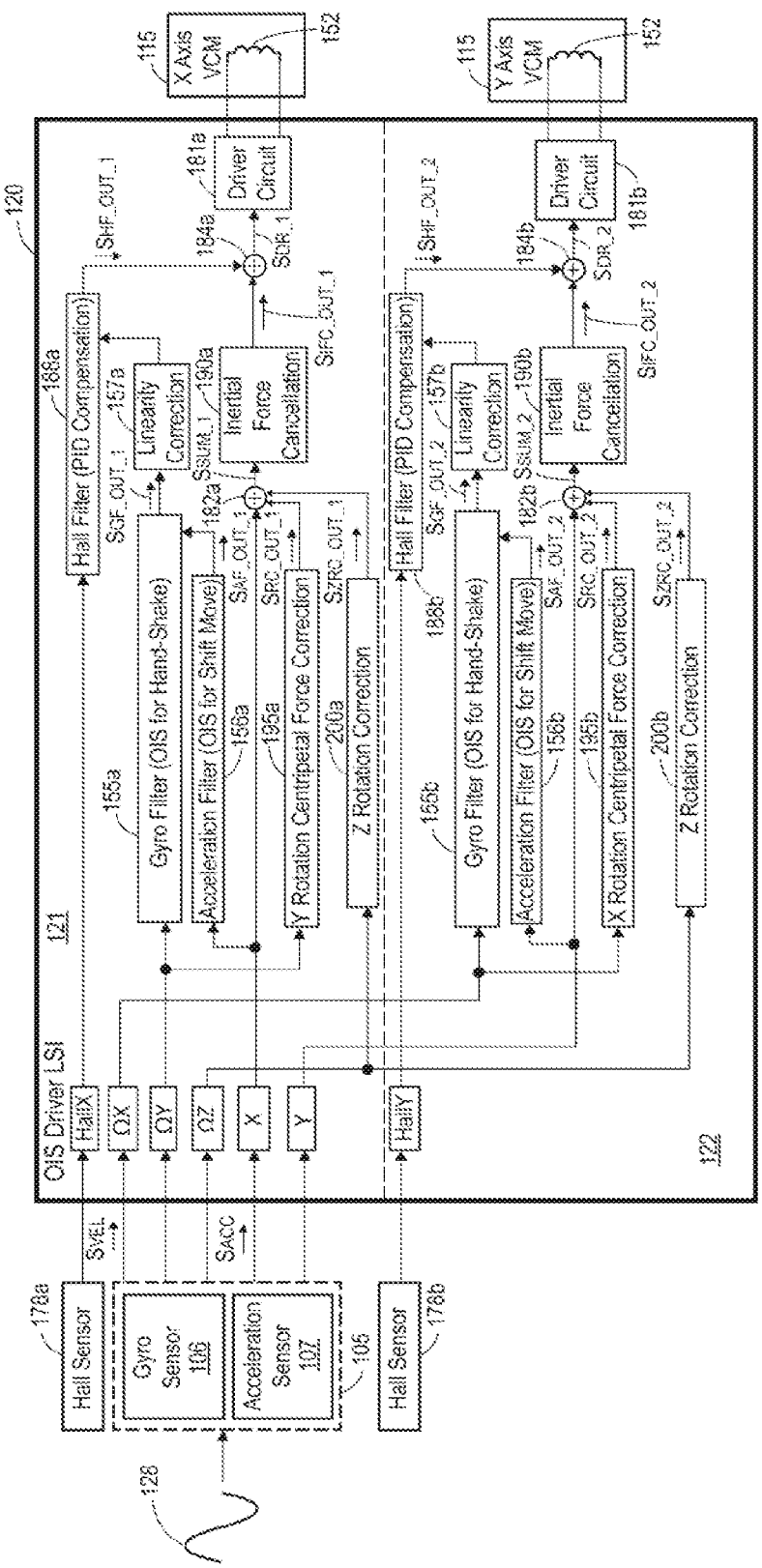
FIG. 3 is a block diagram of a closed-loop actuator control circuit in accordance with an exemplary embodiment of the present technology.

Referring to FIG. 1, an exemplary system 100 may be integrated in any suitable electronic device that comprises an image sensor 150, such as a cell phone, tablet, and the like. In various applications, the system 100 may operate to stabilize various components of the imaging system, such as a lens 142 (e.g., as illustrated in FIGS. 11-15), and to correct for movements of the cell phone, for example movements caused by involuntary movements, such as hand tremors, or voluntary movements, such as position changes to the electronic device. In the present application, the system 100 may be referred to as an optical image stabilization (OIS) system. According to various embodiments, the system 100 may comprise a sensor 105, an actuator 115, and an actuator control circuit 120. The system 100 may further comprise a processor 110. In addition, the system 100 may be configured as an open-loop system (e.g., as illustrated in FIG. 2) or as a closed-loop system (e.g., as illustrated in FIG. 3).

The sensor 105 may be configured to measure the orientation, rotation, motion, and/or angular velocity of the electronic device and generate a corresponding signal. The signal may be an analog signal. In particular, the sensor 105 may detect a disturbance signal 128, such as a vibration, or the like, applied to the system 100 and generate a signal in response to detecting the disturbance signal 128. The sensor 105 may comprise at least one of a gyro sensor 106 and an acceleration sensor 107. The disturbance signal 128 may be applied to the system 100 in an x-, y-, and/or a z-axis direction.

The sensor 105 may be connected to the actuator control circuit 120 and configured to transmit the signal to the actuator control circuit 120. The signal may comprise a first input signal corresponding to an angular velocity of the device (i.e., a velocity signal $S_{VEL}$) and/or a second input signal corresponding to an acceleration of the device (i.e., an acceleration signal $S_{ACC}$). The velocity signal $S_{VEL}$ may comprise first x-, y-, and z-components, and the acceleration signal $S_{ACC}$ may comprise second x- and y-components. Each component may correspond to an axis of an x-y-z reference coordinate system, where the x-axis direction and the y-axis direction may each be defined to be orthogonal to the z-axis direction.

The sensor 105 may comprise any suitable sensor system or device configured to detect motion, rotation, and/or angular velocity produced by external disturbances and generate a corresponding electrical signal. The sensor 105 may be selected according to a particular application and may be selected according to various specifications, such as sensing range, output type, supply current, operating temperature, and the like. In one embodiment, the sensor 105 may be mounted on the electronic device and formed on a separate substrate from the actuator control circuit 120. In another embodiment, the sensor 105 may be formed on the same substrate as the actuator control circuit 120. The substrate may be any suitable substrate, such as a printed circuit board (PCB), or the like.

Figure 9:
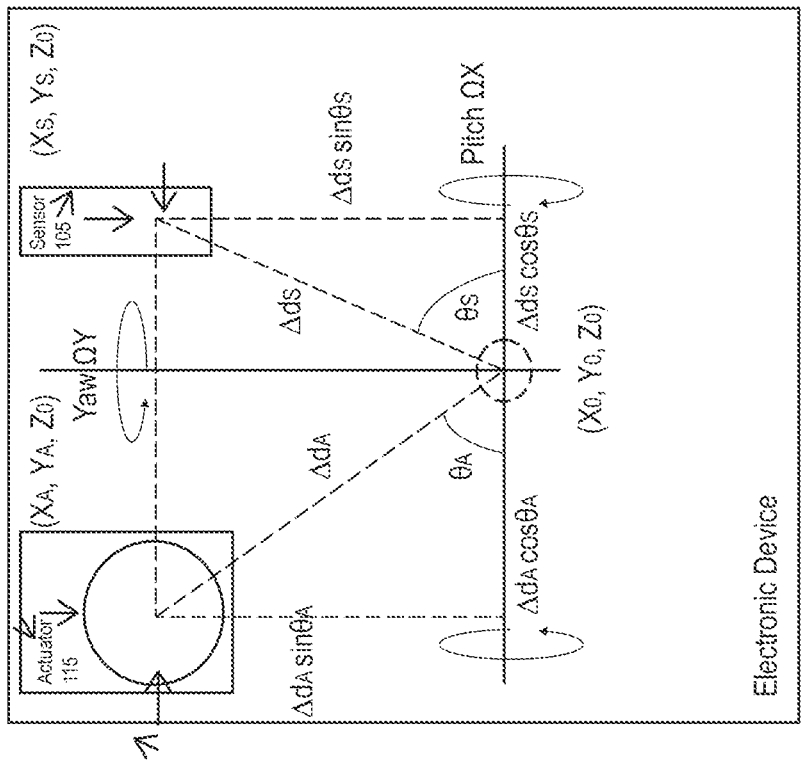
FIG. 9 representatively illustrates a sensor and an actuator in first and second orientations for operating the optical image stabilization system in accordance with an exemplary embodiment of the present technology.
Figure 10:
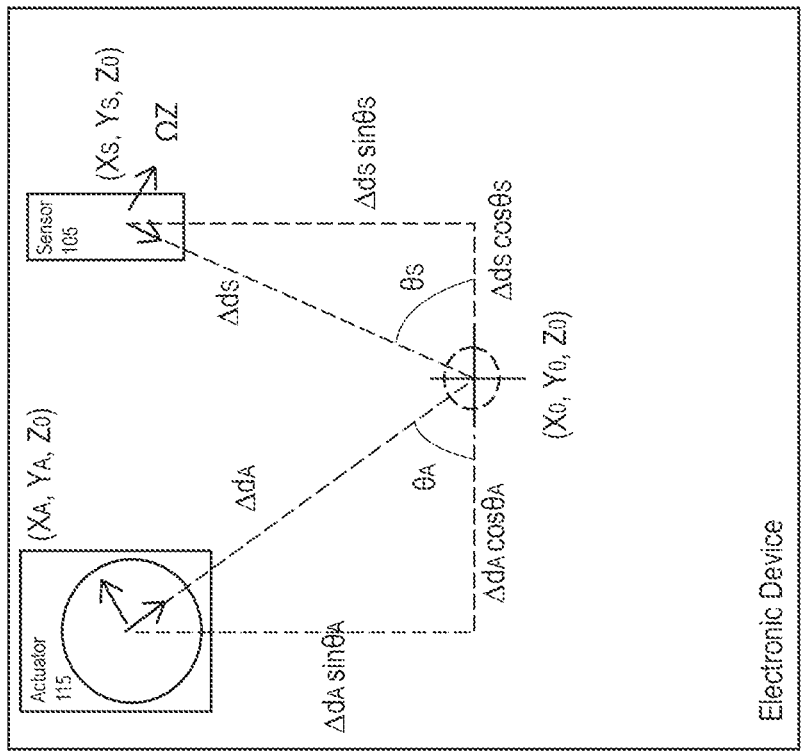
FIG. 10 representatively illustrates a sensor and an actuator in a third orientation for operating the optical image stabilization system in accordance with an exemplary embodiment of the present technology.

The sensor 105 may rotate around a center of rotation (i.e., a reference point) of the system 100 (e.g., as illustrated in FIGS. 9-10). The center of rotation may be represented by reference coordinates $(X_0, Y_0, Z_0)$. The sensor 105 may be located at a distance from the center of rotation, where the distance may be represented by $\Delta d_S$. Accordingly, the sensor 105 may be located at coordinates $(X_S, Y_S, Z_0)$, where coordinates $(X_S, Y_S, Z_0)$ are defined with respect to the reference coordinates $(X_0, Y_0, Z_0)$.

The actuator 115 may be configured to move the lens 142 along various axes (e.g., x-, y-, and/or z-axes) to improve image quality. The actuator 115 may comprise any suitable device or system capable of moving and/or repositioning the lens 142 in response to a signal. The actuator 115 may correct for involuntary movements of the lens 142 caused by the disturbance signal 128, and may also stabilize imaging by driving the lens 142 in a direction opposite that of the disturbance signal 128 to prevent image blurring. For example, and referring now to FIG. 15, the actuator 115 may be configured as a voice coil motor (VCM), comprising a magnet 185 and a coil 152 that is responsive to a drive signal $S_{DR}$ sent from the actuator control circuit 120. The actuator 115 may generate a drive force $F_{DR}$ corresponding to the drive signal $S_{DR}$ and apply the drive force $F_{DR}$ to the lens 142 to position the lens 142 along the x-, and/or y-axes. The lens 142 may be moved or otherwise repositioned to correct for any displacement/deviations caused by the disturbance signal 128. The actuator 115 may be limited in the amount of movement it can perform, whether self-limiting or due to the design of the system. For example, the lens 142 may be enclosed in a housing (not shown) with sidewalls. As such, a maximum range of movement the actuator 115 may impart to the lens 142 may be limited by the interior dimensions of the housing.

The actuator 115 may rotate around the center of rotation (i.e., the reference point) of the system 100 (e.g., as illustrated in FIGS. 9-10). The actuator 115 may be located at a distance from the center of rotation, where the distance may be represented by $\Delta d_A$. Accordingly, the actuator 115 may be located at coordinates $(X_A, Y_A, Z_0)$, where coordinates $(X_A, Y_A, Z_0)$ are defined with respect to the reference coordinates $(X_0, Y_0, Z_0)$.

The lens 142 may comprise any lens or lens system suitable for focusing light on the image sensor 150. For example, in various embodiments, the lens 142 may comprise a single lens element. Alternatively, the lens 142 may comprise a plurality of lens elements arranged adjacent to each other. The lens 142 may be formed using any suitable material, such as glass, quartz glass, fluorite, germanium, meteoritic glass, polycarbonate, plastic, high-index plastic, and the like, or any combination thereof.

The processor 110 may be configured to perform the various processing operations of the system 100, including the processing operations associated with calibrating the drive signal $S_{DR}$. In various embodiments, the processor 110 may be configured to enable and/or disable various components in the system 100.

The processor 110 may issue time varying commands to the actuator control circuit 120 to generate the drive signal $S_{DR}$. The processor 110 may be further configured to determine the magnitude of the drive signal $S_{DR}$ along with its corresponding drive force $F_{DR}$. In some embodiments, the processor 110 may be implemented externally to the image sensor 150.

In addition, the processor 110 may be further configured to generate various position instruction values $P_{REF(X,Y,Z)}$ and may instruct the system 100 to position the lens 142 in the x-, y-, and/or z-axis direction according to the position instruction values $P_{REF(X,Y,Z)}$. The position instruction values $P_{REF(X,Y,Z)}$ may be generated based on the drive signal $S_{DR}$ and may, for example, indicate the target position and/or the current position of the lens 142. Each position instruction value $P_{REF(X,Y,Z)}$ may correspond to one component (x-, y-, and/or z-component) of the current position and/or the target position of the lens 142. The processor 110 may comprise any suitable processing device, such as microprocessors, application processors, microcontrollers, programmable logic devices, or the like.

In various embodiments, and referring now to FIGS. 1-3, the actuator control circuit 120 may be configured to control and supply power to various devices within the system 100. For example, the actuator control circuit 120 may supply power to the actuator 115 via the drive signal $S_{DR}$. The drive signal $S_{DR}$ may control a current and/or a voltage in the actuator 115, which may control the movement of the actuator 115. Accordingly, the movement of the actuator 115 may be proportional to the magnitude of the drive signal $S_{DR}$. The actuator control circuit 120 may comprise any suitable control device or system capable of providing energy to the actuator 115.

In various embodiments, such as in a closed-loop system, the actuator control circuit 120 may receive and respond to a feedback signal, such as a hall sensor signal from a first hall sensor 178a and/or a second hall sensor 178b. Each hall sensor 178a, 178b may be configured to detect an actual position of the actuator 115 and/or the lens 142. The position of the actuator 115 and/or the lens 142 may be defined with respect to the reference x-y-z coordinate system.

The actuator control circuit 120 may be configured to transmit the drive signal $S_{DR}$ to the actuator 115 via a first axis and a second axis. For example, the actuator control circuit 120 may transmit a first drive signal $S_{DR\_1}$ to the actuator 115 via a first driver circuit 181a and a second drive signal $S_{DR\_2}$ to the actuator 115 via a second driver circuit 181b. It will be appreciated that the drive signal $S_{DR}$ may be represented by the first drive signal $S_{DR\_1}$ and/or the second drive signal $S_{DR\_2}$.

In various embodiments, the actuator control circuit 120 may comprise a first circuit portion 121 and a second circuit portion 122, each capable of receiving the first input signal, such as the velocity signal $S_{VEL}$, and the second input signal, such as the acceleration signal $S_{ACC}$, from the gyro sensor 106 and the acceleration sensor 107, respectively.

In an exemplary embodiment, the first circuit portion 121 may comprise a first centripetal force correction circuit 195a and a first z-rotation correction circuit 200a. The second circuit portion 122 may comprise a second centripetal force correction circuit 195b and a second z-rotation correction circuit 200b.

Figure 4:
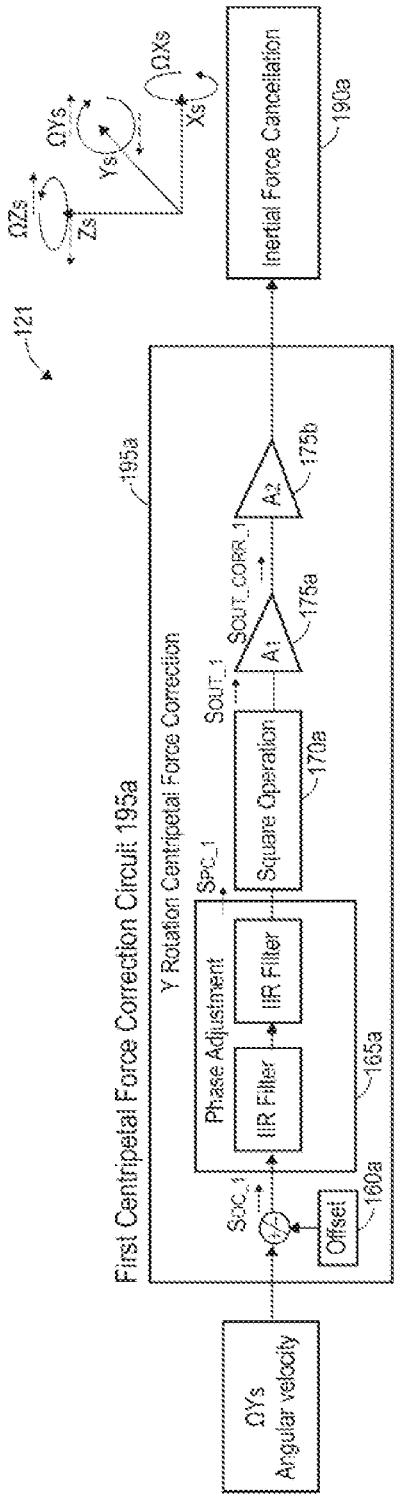
FIG. 4 is a block diagram of a first portion of the actuator control circuit in accordance with an exemplary embodiment of the present technology.

In various embodiments, and referring now to FIG. 4, the first centripetal force correction circuit 195a may comprise a first sub-circuit (i.e., a first offset correction circuit 160a), a second sub-circuit (i.e., a first phase correction circuit 165a), a third sub-circuit (i.e., a first calculation circuit 170a), a first gain circuit 175a, and a second gain circuit 175b.

Figure 5:
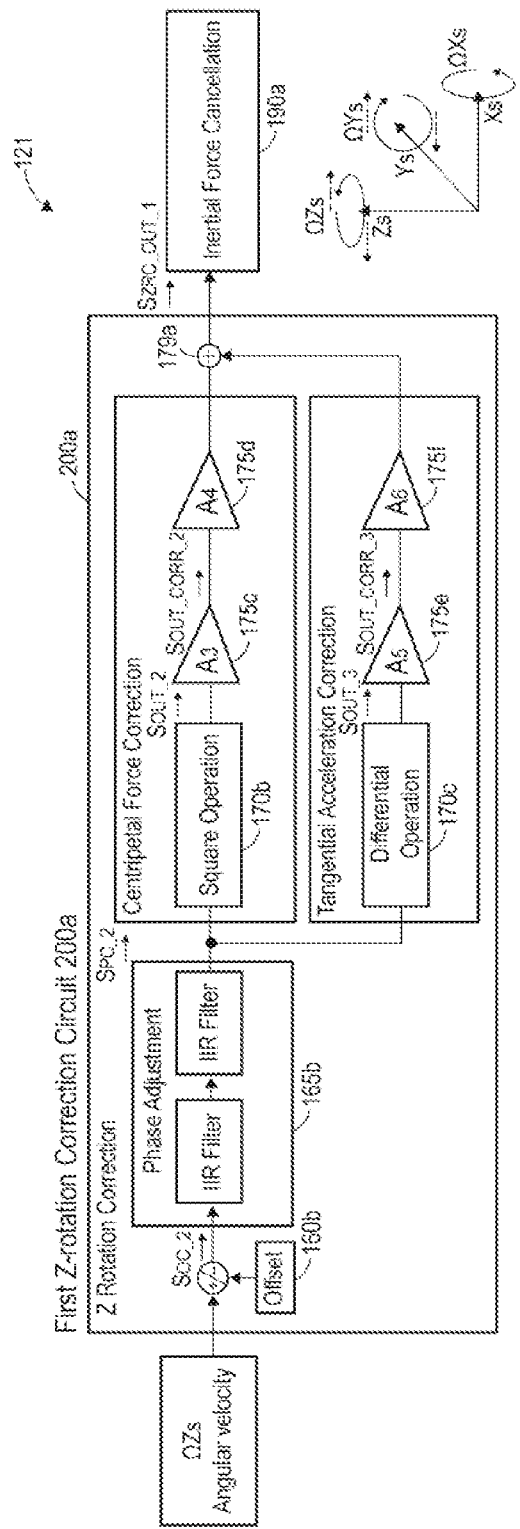
FIG. 5 is a block diagram of a second portion of the actuator control circuit in accordance with an exemplary embodiment of the present technology.

In various embodiments, and referring now to FIG. 5, the first z-rotation correction circuit 200a may comprise a fourth sub-circuit (i.e., a second offset correction circuit 160b), a fifth sub-circuit (i.e., a second phase correction circuit 165b), a sixth sub-circuit (i.e., a second calculation circuit 170b), a third gain circuit 175c, a fourth gain circuit 175d, a seventh sub-circuit (i.e., a third calculation circuit 170c), a fifth gain circuit 175e, and a sixth gain circuit 175f.

Figure 6:
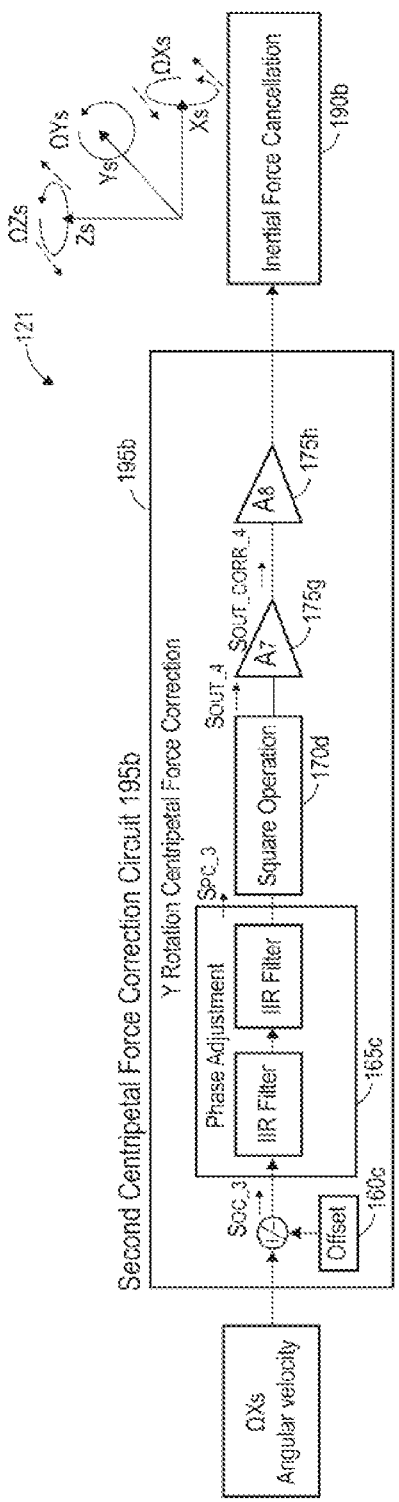
FIG. 6 is a block diagram of a third portion of the actuator control circuit in accordance with an exemplary embodiment of the present technology.

In various embodiments, and referring now to FIG. 6, the second centripetal force correction circuit 195b may comprise an eighth sub-circuit (i.e., a third offset correction circuit 160c), a ninth sub-circuit (i.e., a third phase correction circuit 165c), a tenth sub-circuit (i.e., a fourth calculation circuit 170d), a seventh gain circuit 175g, and an eighth gain circuit 175h.

Figure 7:
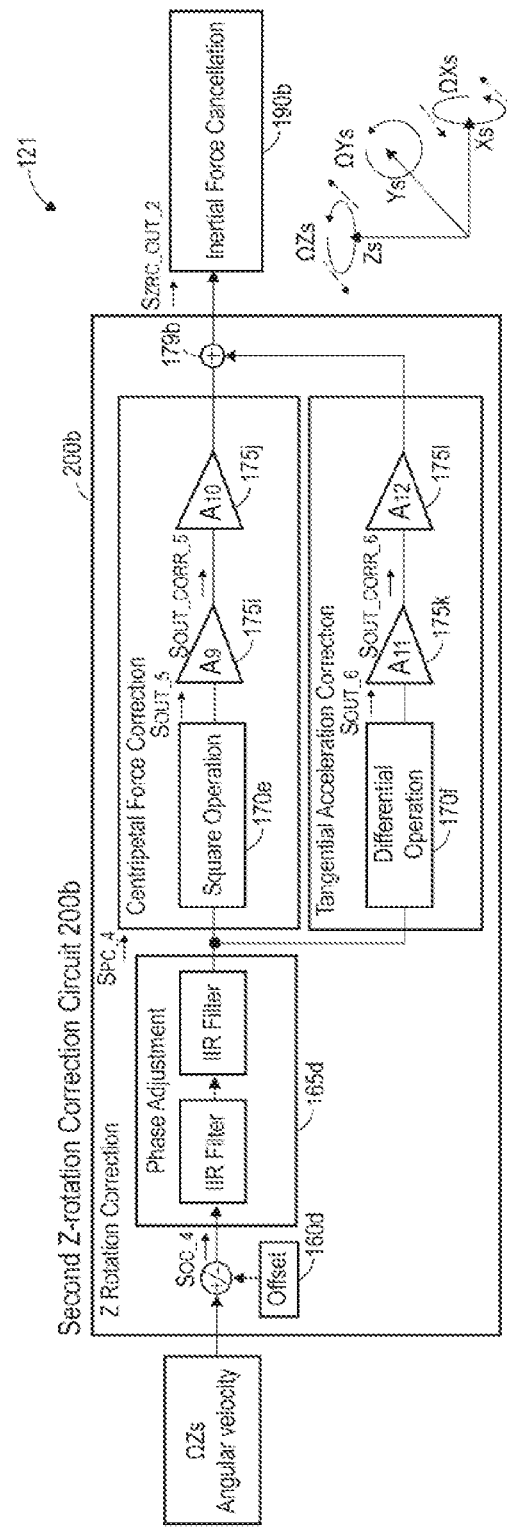
FIG. 7 is a block diagram of a fourth portion of the actuator control circuit in accordance with an exemplary embodiment of the present technology.

In various embodiments, and referring now to FIG. 7, the second z-rotation correction circuit 200b may comprise an eleventh sub-circuit (i.e., a fourth offset correction circuit 160d), a twelfth sub-circuit (i.e., a fourth phase correction circuit 165d), a thirteenth sub-circuit (i.e., a fifth calculation circuit 170e), a ninth gain circuit 175i, a tenth gain circuit 175j, a fourteenth sub-circuit (i.e., a sixth calculation circuit 170f), an eleventh gain circuit 175k, and a twelfth gain circuit 175l.

Referring to FIGS. 4-7, each offset correction circuit 160a, 160b, 160c, 160d may be configured to receive one of the x-, y-, and z-components of the velocity signal $S_{VEL}$ and produce an offset-corrected output signal according to one of the x-, y-, and z-components of the velocity signal $S_{VEL}$. Each offset-corrected output signal may be substantially free from any offset errors and/or biases present in one of the x-, y-, and z-components of the velocity signal $S_{VEL}$ received from the gyro sensor 106.

The offset errors and/or biases may be direct current (DC) offset errors and/or biases. The DC offset errors and/or biases present in the x-, y-, and z-components of the velocity signal $S_{VEL}$ may be noise signals and are thus an unwanted addition to the velocity signal $S_{VEL}$. The magnitude of the DC offset errors and/or biases may depend upon the type of gyro sensor 106 being used in the system 100 and may be influenced by certain factors, such as the size of the gyro sensor 106 and/or the temperature of the environment in which the gyro sensor 106 is operating in.

The magnitude of the DC offset errors and/or biases may be predetermined using any suitable calibration method, such as by measuring the amplitude of signals detected by the gyro sensor 106 when the gyro sensor 106 is operating in a reference state (i.e., where the gyro sensor 106 is not being acted upon by the disturbance signal 128). Because the gyro sensor 106 is not being acted upon by the disturbance signal 128 during the reference state, signals that are detected may be considered the noise signals.

It will be appreciated that a large number of noise readings may be taken from the gyro sensor 106 such that an average amplitude of the noise signals may be determined to more accurately determine the magnitude of the DC offset errors and/or biases.

Accordingly, each offset correction circuit 160a, 160b, 160c, 160d may be configured to generate a respective offset-corrected output signal by subtracting a signal equal in magnitude to the noise signal from one of the x-, y-, and z-components received from the gyro sensor 106. Each offset correction circuit 160a, 160b, 160c, 160d may transmit its respective offset-corrected output signal to another circuit component for additional processing.

The first offset correction circuit 160a may be configured to receive the y-component of the velocity signal $S_{VEL}$ from the gyro sensor 106. The first offset correction circuit 160a may be further configured to generate a first offset-corrected signal $S_{OC\_1}$ according to the y-component of the velocity signal $S_{VEL}$. For example, the first offset correction circuit 160a may subtract a DC offset error and/or bias from the y-component of the velocity signal $S_{VEL}$. The first offset correction circuit 160a may be further configured to transmit the first offset-corrected signal $S_{OC\_1}$ to another circuit component, such as the first phase correction circuit 165a, for additional processing. The first offset correction circuit 160a may comprise any suitable computation circuit configured to receive the y-component of the velocity signal $S_{VEL}$ and remove the DC offset error and/or bias from the y-component.

The second offset correction circuit 160b may be configured to receive the z-component of the velocity signal $S_{VEL}$ from the gyro sensor 106. The second offset correction circuit 160b may be further configured to generate a second offset-corrected signal $S_{OC\_2}$ according to the z-component of the velocity signal $S_{VEL}$. For example, the second offset correction circuit 160b may subtract a DC offset error and/or bias from the z-component of the velocity signal $S_{VEL}$. The second offset correction circuit 160b may be further configured to transmit the second offset-corrected signal $S_{OC\_2}$ to another circuit component, such as the second phase correction circuit 165b, for additional processing. The second offset correction circuit 160b may comprise any suitable computation circuit configured to receive the z-component of the velocity signal $S_{VEL}$ and remove the DC offset error and/or bias from the z-component.

The third offset correction circuit 160c may be configured to receive the x-component of the velocity signal $S_{VEL}$ from the gyro sensor 106. The third offset correction circuit 160c may be further configured to generate a third offset-corrected signal $S_{OC\_3}$ according to the x-component of the velocity signal $S_{VEL}$. For example, the third offset correction circuit 160c may subtract a DC offset error and/or bias from the x-component of the velocity signal $S_{VEL}$. The third offset correction circuit 160c may be further configured to transmit the third offset-corrected signal $S_{OC\_3}$ to another circuit component, such as the third phase correction circuit 165c, for additional processing. The third offset correction circuit 160c may comprise any suitable computation circuit configured to receive the x-component of the velocity signal $S_{VEL}$ and remove the DC offset error and/or bias from the x-component.

The fourth offset correction circuit 160d may be configured to receive the z-component of the velocity signal $S_{VEL}$ from the gyro sensor 106. The fourth offset correction circuit 160d may be further configured to generate a fourth offset-corrected signal $S_{OC\_4}$ according to the z-component of the velocity signal $S_{VEL}$. For example, the fourth offset correction circuit 160d may subtract a DC offset error and/or bias from the z-component of the velocity signal $S_{VEL}$. The fourth offset correction circuit 160d may be further configured to transmit the fourth offset-corrected signal $S_{OC\_4}$ to another circuit component, such as the fourth phase correction circuit 165d, for additional processing. The fourth offset correction circuit 160d may comprise any suitable computation circuit configured to receive the z-component of the velocity signal $S_{VEL}$ and remove the DC offset error and/or bias from the z-component.

Each phase correction circuit 165a, 165b, 165c, 165d may be configured to receive a respective one of the offset-corrected output signals $S_{OC\_1}$, $S_{OC\_2}$, $S_{OC\_3}$, $S_{OC\_4}$ from its associated offset correction circuit 160a, 160b, 160c, 160d via a signal line or any suitable communication line. Each phase correction circuit 165a, 165b, 165c, 165d may be configured to correct a phase offset error present in one of the offset-corrected output signals $S_{OC\_1}$, $S_{OC\_2}$, $S_{OC\_3}$, $S_{OC\_4}$ received from one of the offset correction circuits 160a, 160b, 160c, 160d by generating a phase-corrected output signal that is shifted in phase with respect to the offset-corrected output signal $S_{OC\_1}$, $S_{OC\_2}$, $S_{OC\_3}$, $S_{OC\_4}$ supplied to it from one of the offset correction circuits 160a, 160b, 160c, 160d.

Figure 8:
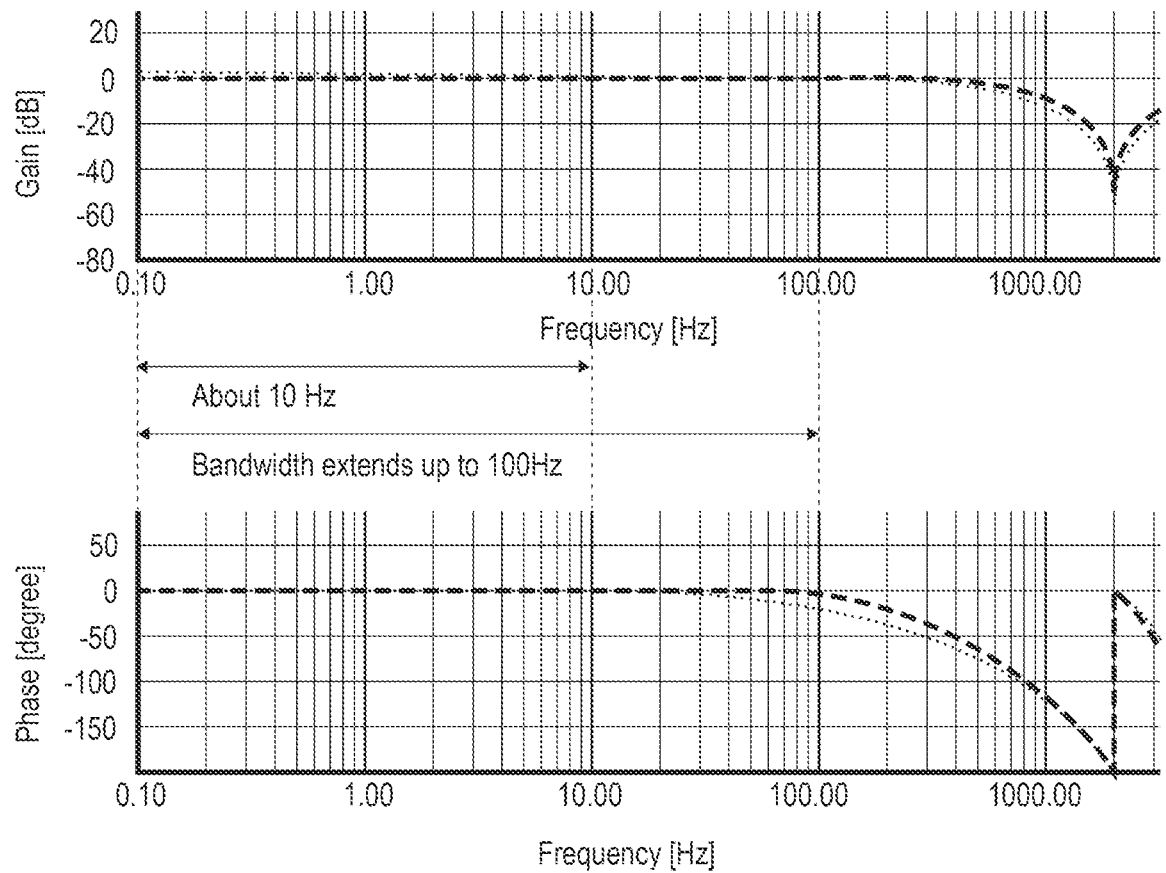
FIG. 8 is a graph illustrating a difference in phase angle between a disturbance signal applied to the optical image stabilization system and a resulting acceleration signal applied to a portion of the optical image stabilization system.

The phase offset error may be a difference in phase angle between the disturbance signal 128 applied to the system 100 and the resulting acceleration signal detected by the sensor 105 and applied to the lens 142 for any given frequency at which the disturbance signal 128 operates. The phase offset error may be caused by a misalignment of the actuator control circuit 120, a time constant of the sensor 105, a frequency of a disturbance signal that is beyond the maximum allowed bandwidth of the sensor 105, a communication delay between the sensor 105 and the actuator control circuit 120, and the like. As an example, and referring to FIG. 8, when the disturbance signal 128 is operating at a frequency of 100 Hz and is applied to the system 100, there may be a sizeable phase offset error (e.g., in or around 20 degrees) between the disturbance signal 128 applied to the system 100 and the resulting acceleration signal detected by the sensor 105 and applied to the lens 142. Because the acceleration signal causes a force to be applied to the lens 142, the phase offset error may cause the lens 142 to vibrate uncontrollably.

The first phase correction circuit 165a may be configured to receive the first offset-corrected signal $S_{OC\_1}$ from the first offset correction circuit 160a via a signal line or any suitable communication line. The first phase correction circuit 165a may be further configured to generate a first phase-corrected signal $S_{PC\_1}$ according to the first offset-corrected signal $S_{OC\_1}$.

The first phase correction circuit 165a may comprise one or more suitable filters capable of substantially removing the phase offset errors present in the first offset-corrected signal $S_{OC\_1}$, such as an infinite impulse response (IIR) filter, or the like. The one or more filters may be a low-boost filter, a high-boost filter, or the like. The first phase correction circuit 165a may be further configured to transmit the first phase-corrected signal $S_{PC\_1}$ to the first calculation circuit 170a for further processing.

The second phase correction circuit 165b may be configured to receive the second offset-corrected signal $S_{OC\_2}$ from the second offset correction circuit 160b via a signal line or any suitable communication line. The second phase correction circuit 165b may be further configured to generate a second phase-corrected signal $S_{PC\_2}$ according to the second offset-corrected signal $S_{OC\_2}$.

The second phase correction circuit 165b may comprise one or more suitable filters capable of substantially removing the phase offset errors present in the second offset-corrected signal $S_{OC\_2}$, such as an infinite impulse response (IIR) filter, or the like. The one or more filters may be a low-boost filter, a high-boost filter, or the like. The second phase correction circuit 165b may be further configured to transmit the second phase-corrected signal $S_{PC\_2}$ to the second calculation circuit 170b and/or the third calculation circuit 170c for further processing.

The third phase correction circuit 165c may be configured to receive the third offset-corrected signal $S_{OC\_3}$ from the third offset correction circuit 160c via a signal line or any suitable communication line. The third phase correction circuit 165c may be further configured to generate a third phase-corrected signal $S_{PC\_3}$ according to the third offset-corrected signal $S_{OC\_3}$.

The third phase correction circuit 165c may comprise one or more suitable filters capable of substantially removing the phase offset errors present in the third offset-corrected signal $S_{OC\_3}$, such as an infinite impulse response (IIR) filter, or the like. The one or more filters may be a low-boost filter, a high-boost filter, or the like. The third phase correction circuit 165c may be further configured to transmit the third phase-corrected signal $S_{PC\_3}$ to the fourth calculation circuit 170d for further processing.

The fourth phase correction circuit 165d may be configured to receive the fourth offset-corrected signal $S_{OC\_4}$ from the fourth offset correction circuit 160d via a signal line or any suitable communication line. The fourth phase correction circuit 165d may be further configured to generate a fourth phase-corrected signal $S_{PC\_4}$ according to the fourth offset-corrected signal $S_{OC\_4}$.

The fourth phase correction circuit 165d may comprise one or more suitable filters capable of substantially removing the phase offset errors present in the fourth offset-corrected signal $S_{OC\_4}$, such as an infinite impulse response (IIR) filter, or the like. The one or more filters may be a low-boost filter, a high-boost filter, or the like. The fourth phase correction circuit 165d may be further configured to transmit the fourth phase-corrected signal $S_{PC\_4}$ to the fifth calculation circuit 170e and/or the sixth calculation circuit 170f for further processing.

In various embodiments, the calculation circuits 170a-170f may each comprise any circuit and/or system suitable for performing various calculations, such as division, multiplication, and the like. For example, each calculation circuit may comprise a system of logic circuits or a field programmable gate array circuit. The calculation circuits may be integrated within the actuator control circuit 120, or alternatively, may be formed on a companion circuit that is accessible to the actuator control circuit 120.

The first calculation circuit 170a may be configured to receive the first phase-corrected signal $S_{PC\_1}$ and generate a first output signal $S_{OUT\_1}$ according to the first phase-corrected signal $S_{PC\_1}$. For example, the first calculation circuit 170a may be configured to compute a square of the first phase-corrected signal $S_{PC\_1}$. The first calculation circuit 170a may be further configured to transmit the computed square of the first phase-corrected signal $S_{PC\_1}$, in the form of the first output signal $S_{OUT\_1}$, to the first gain circuit 175a for further processing. In an exemplary embodiment, the first output signal $S_{OUT\_1}$ may be described by the following equation:

$$S_{OUT\_1} = S_{PC\_1}^2 \quad \text{(Equation 1)}$$

The second calculation circuit 170b may be configured to receive the second phase-corrected signal $S_{PC\_2}$ and generate a second output signal $S_{OUT\_2}$ according to the second phase-corrected signal $S_{PC\_2}$. For example, the second calculation circuit 170b may be configured to compute a square of the second phase-corrected signal $S_{PC\_2}$. The second calculation circuit 170b may be further configured to transmit the computed square of the second phase-corrected signal $S_{PC\_2}$, in the form of the second output signal $S_{OUT\_2}$, to the third gain circuit 175c for further processing. In an exemplary embodiment, the second output signal $S_{OUT\_2}$ may be described by the following equation:

$$S_{OUT\_2} = S_{PC\_2}^2 \quad \text{(Equation 2)}$$

The third calculation circuit 170c may be configured to receive the second phase-corrected signal $S_{PC\_2}$ and generate a third output signal $S_{OUT\_3}$ according to the second phase-corrected signal $S_{PC\_2}$. For example, the third calculation circuit 170c may be configured to compute a first derivative of the second phase-corrected signal $S_{PC\_2}$. The third calculation circuit 170c may be further configured to transmit the first derivative of the second phase-corrected signal $S_{PC\_2}$, in the form of the third output signal $S_{OUT\_3}$, to the fifth gain circuit 175e for further processing. In an exemplary embodiment, the third output signal $S_{OUT\_3}$ may be described by the following equation:

$$S_{OUT\_3} = \frac{d}{dt} S_{PC\_2} \quad \text{(Equation 3)}$$

The fourth calculation circuit 170d may be configured to receive the third phase-corrected signal $S_{PC\_3}$ and generate a fourth output signal $S_{OUT\_4}$ according to the third phase-corrected signal $S_{PC\_3}$. For example, the fourth calculation circuit 170d may be configured to compute a square of the third phase-corrected signal $S_{PC\_3}$. The fourth calculation circuit 170d may be further configured to transmit the square of the third phase-corrected signal $S_{PC\_3}$, in the form of the fourth output signal $S_{OUT\_4}$, to the seventh gain circuit 175g for further processing. In an exemplary embodiment, the fourth output signal $S_{OUT\_4}$ may be described by the following equation:

$$S_{OUT\_4} = S_{PC\_3}^2 \quad \text{(Equation 4)}$$

The fifth calculation circuit 170e may be configured to receive the fourth phase-corrected signal $S_{PC\_4}$ and generate a fifth output signal $S_{OUT\_5}$ according to the fourth phase-corrected signal $S_{PC\_4}$. For example, the fifth calculation circuit 170e may be configured to compute a square of the fourth phase-corrected signal $S_{PC\_4}$. The fifth calculation circuit 170e may be further configured to transmit the square of the fourth phase-corrected signal $S_{PC\_4}$, in the form of the fifth output signal $S_{OUT\_5}$, to the ninth gain circuit 175i for further processing. In an exemplary embodiment, the fifth output signal $S_{OUT\_5}$ may be described by the following equation:

$$S_{OUT\_5} = S_{PC\_4}^2 \quad \text{(Equation 5)}$$

The sixth calculation circuit 170f may be configured to receive the fourth phase-corrected signal $S_{PC\_4}$ and generate a sixth output signal $S_{OUT\_6}$ according to the fourth phase-corrected signal $S_{PC\_4}$. For example, the sixth calculation circuit 170f may be configured to compute a first derivative of the fourth phase-corrected signal $S_{PC\_4}$. The sixth calculation circuit 170f may be further configured to transmit the first derivative of the fourth phase-corrected signal $S_{PC\_4}$, in the form of the sixth output signal $S_{OUT\_6}$, to the eleventh gain circuit 175k for further processing. In an exemplary embodiment, the sixth output signal $S_{OUT\_6}$ may be described by the following equation:

$$S_{OUT\_6} = \frac{d}{dt} S_{PC\_4} \quad \text{(Equation 6)}$$

The first gain circuit 175a may be connected to an output terminal of the first calculation circuit 170a. The first gain circuit 175a may be configured to receive the first output signal $S_{OUT\_1}$ and generate a first corrected output signal $S_{OUT\_CORR\_1}$ according to the first output signal $S_{OUT\_1}$. For example, the first gain circuit 175a may apply a first correction gain $A_1$ to the first output signal $S_{OUT\_1}$. After the first correction gain $A_1$ has been applied to the first output signal $S_{OUT\_1}$, the resulting first corrected output signal $S_{OUT\_CORR\_1}$ may be sent to another circuit component, such as the second gain circuit 175b, for further processing. The first gain circuit 175a may comprise a gain circuit or any other circuit and/or system suitable for receiving an input signal and applying a gain to the input signal.

The first correction gain $A_1$ may be determined according to a first distance between the sensor 105 and the actuator 115. The first distance may be along a direction of the x-axis and may be determined according to a first relative position of the sensor 105 with respect to the actuator 115. The first relative position may be determined according to the x-axis coordinates of the sensor 105 and the actuator 115, such as coordinates $X_S$, $X_A$. Coordinates $X_S$, $X_A$ may be defined with respect to the reference point. Because the first correction gain $A_1$ is determined according to the first relative position of the sensor 105 with respect to the actuator 115, the first correction gain $A_1$ may be determined regardless of where the reference point is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the first correction gain $A_1$ may be proportional to the first distance.

It will also be appreciated that the first correction gain $A_1$ may be referred to as a "characterization coefficient." Because the first correction gain $A_1$ is a "characterization coefficient," it may have a constant value that remains the same for each electronic device (i.e., module) that is manufactured.

The second gain circuit 175b may be connected to an output terminal of the first gain circuit 175a. The second gain circuit 175b may be configured to receive the first corrected output signal $S_{OUT\_CORR\_1}$ from the first gain circuit 175a and apply a second correction gain $A_2$ to the first corrected output signal $S_{OUT\_CORR\_1}$. After the second correction gain $A_2$ has been applied to the first corrected output signal $S_{OUT\_CORR\_1}$, the resulting amplified first corrected output signal may be transmitted to a first addition circuit 182a for additional processing. The second gain circuit 175b may comprise a gain circuit or any other circuit and/or system suitable for receiving an input signal and applying a gain to the input signal.

It will be appreciated that the second correction gain $A_2$ may be referred to as a "calibration coefficient." Because the second correction gain $A_2$ is a "calibration coefficient," it may change across each module that is manufactured. As an example, each module may be defined by its own characteristics, such as a mass of the lens 142, a magnetic flux density B associated with the coil 152, and a length L of the coil 152. Given that the values of m, B, and L may fluctuate across the different modules that are manufactured, the second correction gain $A_2$ may change across the different modules.

The third gain circuit 175c may be connected to an output terminal of the second calculation circuit 170b. The third gain circuit 175c may be configured to receive the second output signal $S_{OUT\_2}$ and generate a second corrected output signal $S_{OUT\_CORR\_2}$ according to the second output signal $S_{OUT\_2}$. For example, the third gain circuit 175c may apply a third correction gain $A_3$ to the second output signal $S_{OUT\_2}$.

After the third correction gain $A_3$ has been applied to the second output signal $S_{OUT\_2}$, the resulting second corrected output signal $S_{OUT\_CORR\_2}$ may be sent to another circuit component, such as the fourth gain circuit 175d, for further processing. The third gain circuit 175c may comprise a gain circuit or any other circuit and/or system suitable for receiving an input signal and applying a gain to the input signal.

The third correction gain $A_3$ may be determined according to a second distance between the sensor 105 and the actuator 115. The second distance may be along a direction of the x-axis and may be determined according to a second relative position of the sensor 105 with respect to the actuator 115. The second relative position may be determined according to the x-axis coordinates of the sensor 105 and the actuator 115, such as coordinates $X_S$, $X_A$. As discussed above, coordinates $X_S$, $X_A$ may be defined with respect to the reference point. Because the third correction gain $A_3$ is determined according to the second relative position of the sensor 105 with respect to the actuator 115, the third correction gain $A_3$ is determined regardless of where the reference point is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the third correction gain $A_3$ may be proportional to the second distance.

It will also be appreciated that the third correction gain $A_3$ may be referred to as a "characterization coefficient." Because the third correction gain $A_3$ is a "characterization coefficient," it may have a constant value that remains the same for each electronic device (i.e., module) that is manufactured.

The fourth gain circuit 175d may be connected to an output terminal of the third gain circuit 175c. The fourth gain circuit 175d may be configured to receive the second corrected output signal $S_{OUT\_CORR\_2}$ from the third gain circuit 175c and apply a fourth correction gain $A_4$ to the second corrected output signal $S_{OUT\_CORR\_2}$. After the fourth correction gain $A_4$ has been applied to the second corrected output signal $S_{OUT\_CORR\_2}$, the resulting amplified second corrected output signal may be transmitted to a second addition circuit 179a for additional processing. The fourth gain circuit 175d may comprise any gain circuit or any other circuit and/or system suitable for receiving an input signal and applying a gain to the input signal.

It will be appreciated that the fourth correction gain $A_4$ may be referred to as a "calibration coefficient." Because the fourth correction gain $A_4$ is a "calibration coefficient," it may change across each module that is manufactured, such as described above. In some embodiments, the fourth correction gain $A_4$ may be equal to the second correction gain $A_2$. In other embodiments, the fourth correction gain $A_4$ may not be equal to the second correction gain $A_2$.

The fifth gain circuit 175e may be connected to an output terminal of the third calculation circuit 170c. The fifth gain circuit 175e may be configured to receive the third output signal $S_{OUT\_3}$ and generate a third corrected output signal $S_{OUT\_CORR\_3}$ according to the third output signal $S_{OUT\_3}$. For example, the fifth gain circuit 175e may apply a fifth correction gain $A_5$ to the third output signal $S_{OUT\_3}$. After the fifth correction gain $A_5$ has been applied to the third output signal $S_{OUT\_3}$, the resulting third corrected output signal $S_{OUT\_CORR\_3}$ may be sent to another circuit component, such as the sixth gain circuit 175f, for further processing. The fifth gain circuit 175e may comprise any gain circuit or any other circuit and/or system suitable for receiving an input signal and applying a gain to the input signal.

The fifth correction gain $A_5$ may be determined according to a third distance between the sensor 105 and the actuator 115. The third distance may be along a direction of the y-axis and may be determined according to a third relative position of the sensor 105 with respect to the actuator 115. The third relative position may be determined according to the y-axis coordinates of the sensor 105 and the actuator 115, such as coordinates $Y_S$, $Y_A$. Coordinates $Y_S$, $Y_A$ may be defined with respect to the reference point. Because the fifth correction gain $A_5$ is determined according to the third relative position of the sensor 105 with respect to the actuator 115, the fifth correction gain $A_5$ is determined regardless of where the reference point is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the fifth correction gain $A_5$ may be proportional to the third distance.

It will also be appreciated that the fifth correction gain $A_5$ may be referred to as a "characterization coefficient." Because the fifth correction gain $A_5$ is a "characterization coefficient," it may have a constant value that remains the same for each electronic device (i.e., module) that is manufactured.

The sixth gain circuit 175f may be connected to an output terminal of the fifth gain circuit 175e. The sixth gain circuit 175f may be configured to receive the third corrected output signal $S_{OUT\_CORR\_3}$ from the fifth gain circuit 175e and apply a sixth correction gain $A_6$ to the third corrected output signal $S_{OUT\_CORR\_3}$. After the sixth correction gain $A_6$ has been applied to the third corrected output signal $S_{OUT\_CORR\_3}$, the resulting amplified third corrected output signal $S_{OUT\_CORR\_3}$ may be transmitted to the second addition circuit 179a, where it may be added to the second corrected output signal $S_{OUT\_CORR\_2}$ to generate a first z-rotational correction output signal $S_{ZRC\_OUT\_1}$. The sixth gain circuit 175f may comprise a gain circuit or any other circuit and/or system suitable for receiving an input signal and applying a gain to the input signal.

It will be appreciated that the sixth correction gain $A_6$ may be referred to as a "calibration coefficient." Because the sixth correction gain $A_6$ is a "calibration coefficient," it may change across each module that is manufactured, such as described above. In some embodiments, the sixth correction gain $A_6$ may be equal to the second correction gain $A_2$. In other embodiments, the sixth correction gain $A_6$ may not be equal to the second correction gain $A_2$.

The seventh gain circuit 175g may be connected to an output terminal of the fourth calculation circuit 170d. The seventh gain circuit 175g may be configured to receive the fourth output signal $S_{OUT\_4}$ and generate a fourth corrected output signal $S_{OUT\_CORR\_4}$ according to the fourth output signal $S_{OUT\_4}$. For example, the seventh gain circuit 175g may apply a seventh correction gain $A_7$ to the fourth output signal $S_{OUT\_4}$. After the seventh correction gain $A_7$ has been applied to the fourth output signal $S_{OUT\_4}$, the resulting fourth corrected output signal $S_{OUT\_CORR\_4}$ may be sent to another circuit component, such as the eighth gain circuit 175h, for further processing. The seventh gain circuit 175g may comprise any gain circuit or any other circuit and/or system suitable for receiving an input signal and applying a gain to the input signal.

The seventh correction gain $A_7$ may be determined according to a fourth distance between the sensor 105 and the actuator 115. The fourth distance may be along a direction of the y-axis and may be determined according to a fourth relative position of the sensor 105 with respect to the actuator 115. The fourth relative position may be determined according to the y-axis coordinates of the sensor 105 and the actuator 115, such as coordinates $Y_S$, $Y_A$. As discussed above, coordinates $Y_S$, $Y_A$ may be defined with respect to the reference point. Because the seventh correction gain $A_7$ is determined according to the fourth relative position of the sensor 105 with respect to the actuator 115, the seventh correction gain $A_7$ is determined regardless of where the reference point is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the seventh correction gain $A_7$ may be proportional to the fourth distance.

It will also be appreciated that the seventh correction gain $A_7$ may be referred to as a "characterization coefficient." Because the seventh correction gain $A_7$ is a "characterization coefficient," it may have a constant value that remains the same for each electronic device (i.e., module) that is manufactured.

The eighth gain circuit 175h may be connected to an output terminal of the seventh gain circuit 175g. The eighth gain circuit 175h may be configured to receive the fourth corrected output signal $S_{OUT\_CORR\_4}$ from the seventh gain circuit 175g and apply an eighth correction gain $A_8$ to the fourth corrected output signal $S_{OUT\_CORR\_4}$. After the eighth correction gain $A_8$ has been applied to the fourth corrected output signal $S_{OUT\_CORR\_4}$, the resulting amplified fourth corrected output signal may be transmitted to a third addition circuit 182b for additional processing. The eighth gain circuit 175h may comprise any gain circuit or any other circuit and/or system suitable for receiving an input signal and applying a gain to the input signal.

It will be appreciated that the eighth correction gain $A_8$ may be referred to as a "calibration coefficient." Because the eighth correction gain $A_8$ is a "calibration coefficient," it may change across each module that is manufactured, such as described above. In some embodiments, the eighth correction gain $A_8$ may be equal to the second correction gain $A_2$. In other embodiments, the eighth correction gain $A_8$ may not be equal to the second correction gain $A_2$.

The ninth gain circuit 175i may be connected to an output terminal of the fifth calculation circuit 170e. The ninth gain circuit 175i may be configured to receive the fifth output signal $S_{OUT\_5}$ and generate a fifth corrected output signal $S_{OUT\_CORR\_5}$ according to the fifth output signal $S_{OUT\_5}$. For example, the ninth gain circuit 175i may apply a ninth correction gain $A_9$ to the fifth output signal $S_{OUT\_5}$. After the ninth correction gain $A_9$ has been applied to the fifth output signal $S_{OUT\_5}$, the resulting fifth corrected output signal $S_{OUT\_CORR\_5}$ may be sent to another circuit component, such as the tenth gain circuit 175j, for further processing. The ninth gain circuit 175i may comprise any gain circuit or any other circuit and/or system suitable for receiving an input signal and applying a gain to the input signal.

The ninth correction gain $A_9$ may be determined according to a fifth distance between the sensor 105 and the actuator 115. The fifth distance may be along a direction of the y-axis and may be determined according to a fifth relative position of the sensor 105 with respect to the actuator 115. The fifth relative position may be determined according to the y-axis coordinates of the sensor 105 and the actuator 115, such as coordinates $Y_S$, $Y_A$. Coordinates $Y_S$, $Y_A$ may be defined with respect to the reference point. Because the ninth correction gain $A_9$ is determined according to the fifth relative position of the sensor 105 with respect to the actuator 115, the ninth correction gain $A_9$ is determined regardless of where the reference point is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the ninth correction gain $A_9$ may be proportional to the fifth distance.

It will also be appreciated that the ninth correction gain $A_9$ may be referred to as a "characterization coefficient." Because the ninth correction gain $A_9$ is a "characterization coefficient," it may have a constant value that remains the same for each electronic device (i.e., module) that is manufactured.

The tenth gain circuit 175$j$ may be connected to an output terminal of the ninth gain circuit 175$i$. The tenth gain circuit 175$j$ may be configured to receive the fifth corrected output signal $S_{OUT\_CORR\_5}$ from the ninth gain circuit 175$i$ and apply a tenth correction gain $A_{10}$ to the fifth corrected output signal $S_{OUT\_CORR\_5}$. After the tenth correction gain $A_{10}$ has been applied to the fifth corrected output signal $S_{OUT\_CORR\_5}$, the resulting amplified fifth corrected output signal may be transmitted to a fourth addition circuit 179$b$ for additional processing. The tenth gain circuit 175$j$ may comprise a gain circuit or any other circuit and/or system suitable for receiving an input signal and applying a gain to the input signal.

It will be appreciated that the tenth correction gain $A_{10}$ may be referred to as a "calibration coefficient." Because the tenth correction gain $A_{10}$ is a "calibration coefficient," it may change across each module that is manufactured, such as described above. In some embodiments, the tenth correction gain $A_{10}$ may be equal to the second correction gain $A_2$. In other embodiments, the tenth correction gain $A_{10}$ may not be equal to the second correction gain $A_2$.

The eleventh gain circuit 175$k$ may be connected to an output terminal of the sixth calculation circuit 170$f$. The eleventh gain circuit 175$k$ may be configured to receive the sixth output signal $S_{OUT\_6}$ and generate a sixth corrected output signal $S_{OUT\_CORR\_6}$ according to the sixth output signal $S_{OUT\_6}$. For example, the eleventh gain circuit 175$k$ may apply an eleventh correction gain $A_{11}$ to the sixth output signal $S_{OUT\_6}$. After the eleventh correction gain $A_{11}$ has been applied to the sixth output signal $S_{OUT\_6}$, the resulting sixth corrected output signal $S_{OUT\_CORR\_6}$ may be sent to another circuit component, such as the twelfth gain circuit 175$l$, for further processing. The eleventh gain circuit 175$k$ may comprise a gain circuit or any other circuit and/or system suitable for receiving an input signal and applying a gain to the input signal.

The eleventh correction gain $A_{11}$ may be determined according to a sixth distance between the sensor 105 and the actuator 115. The sixth distance may be along a direction of the x-axis and may be determined according to a sixth relative position of the sensor 105 with respect to the actuator 115. The sixth relative position may be determined according to the x-axis coordinates of the sensor 105 and the actuator 115, such as coordinates $X_S$, $X_A$. Coordinates $X_S$, $X_A$ may be defined with respect to the reference point.

Because the eleventh correction gain $A_{11}$ is determined according to the sixth relative position of the sensor 105 with respect to the actuator 115, the eleventh correction gain $A_{11}$ is determined regardless of where the reference point is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the eleventh correction gain $A_{11}$ may be proportional to the sixth distance.

It will also be appreciated that the eleventh correction gain $A_{11}$ may be referred to as a "characterization coefficient." Because the eleventh correction gain $A_{11}$ is a "characterization coefficient," it may have a constant value that remains the same for each electronic device (i.e., module) that is manufactured.

The twelfth gain circuit 175$l$ may be connected to an output terminal of the eleventh gain circuit 175$k$. The twelfth gain circuit 175$l$ may be configured to receive the sixth corrected output signal $S_{OUT\_CORR\_6}$ from the eleventh gain circuit 175$k$ and apply a twelfth correction gain $A_{12}$ to the sixth corrected output signal $S_{OUT\_CORR\_6}$. After the twelfth correction gain $A_{12}$ has been applied to the sixth corrected output signal $S_{OUT\_CORR\_6}$, the resulting amplified sixth corrected output signal may be transmitted to the fourth addition circuit 179$b$, where it may be added to the fifth corrected output signal $S_{OUT\_CORR\_5}$ to generate a second z-rotational correction output signal $S_{ZRC\_OUT\_2}$. The twelfth gain circuit 175$l$ may comprise a gain circuit or any other circuit and/or system suitable for receiving an input signal and applying a gain to the input signal.

It will be appreciated that the twelfth correction gain $A_{12}$ may be referred to as a "calibration coefficient." Because the twelfth correction gain $A_{12}$ is a "calibration coefficient," it may change across each module that is manufactured, such as described above. In some embodiments, the twelfth correction gain $A_{12}$ may be equal to the second correction gain $A_2$. In other embodiments, the twelfth correction gain $A_{12}$ may not be equal to the second correction gain $A_2$.

Figure 11:
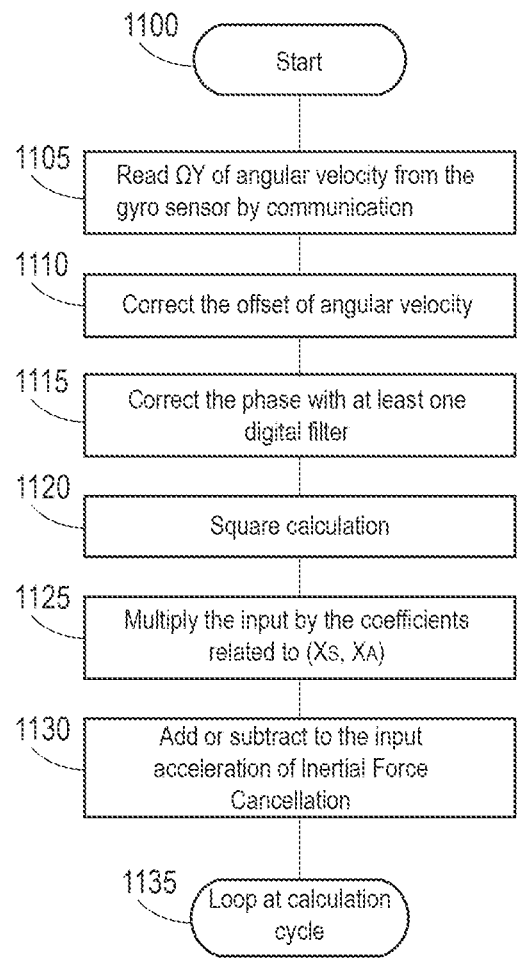
FIG. 11 is a flow diagram for correcting a Y rotation centripetal force along an x-axis of an actuator in accordance with an exemplary embodiment of the present technology.
Figure 12:
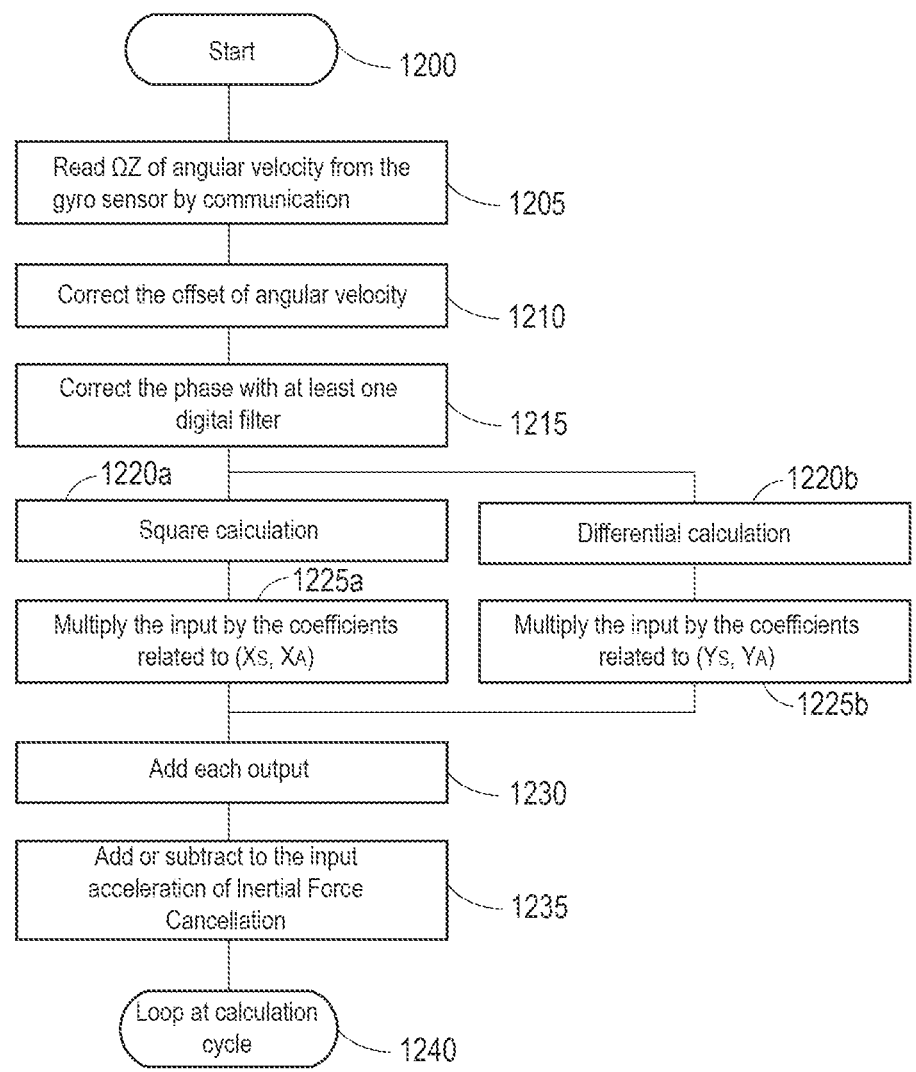
FIG. 12 is a flow diagram for correcting a Z rotation centripetal force along an x-axis of an actuator in accordance with an exemplary embodiment of the present technology.
Figure 13:
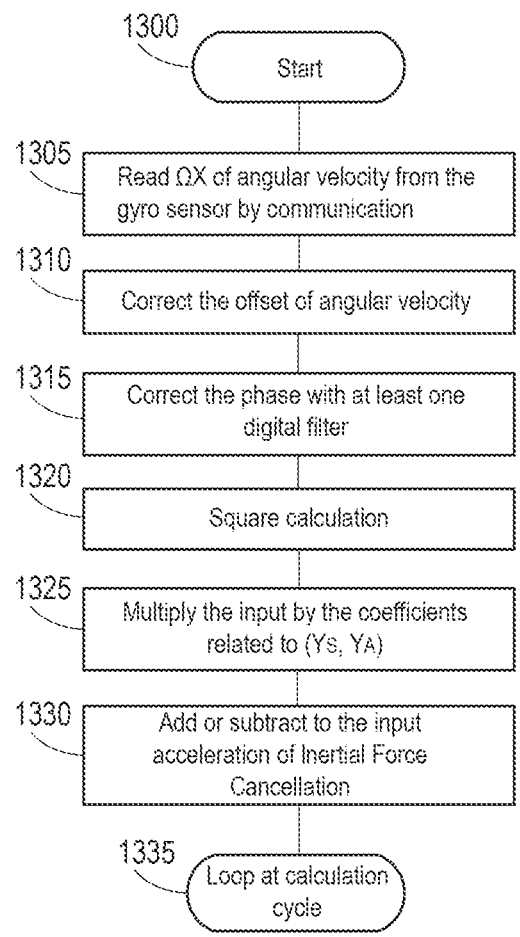
FIG. 13 is a flow diagram for correcting an X rotation centripetal force along a y-axis of an actuator in accordance with an exemplary embodiment of the present technology.
Figure 14:
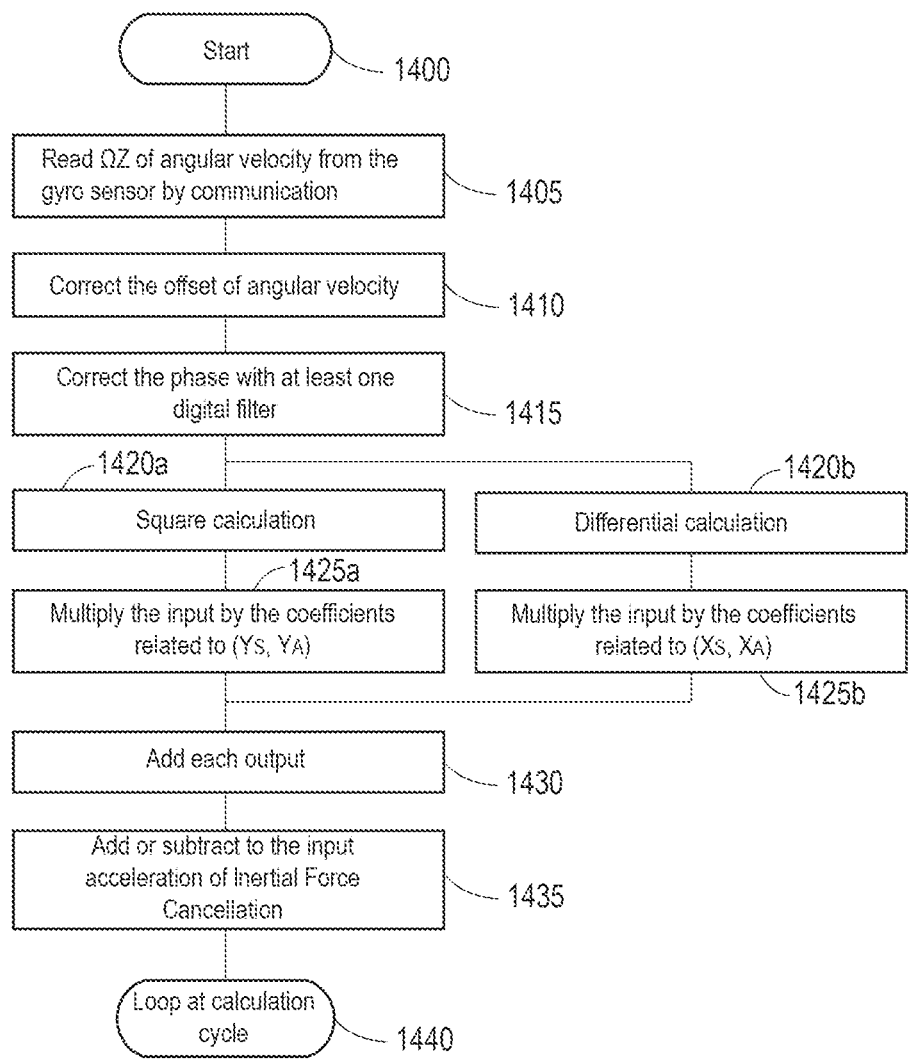
FIG. 14 is a flow diagram for correcting a Z rotation centripetal force along a y-axis of an actuator in accordance with an exemplary embodiment of the present technology.

The first circuit portion 121 may operate in conjunction with a second circuit portion 122 to perform a series of schemes to compensate for the effect that a distance between the sensor 105 and the actuator 115 may have on various components of the system 100, including various subcomponents of the actuator control circuit 120. For example, the system 100 may perform a y-rotation centripetal force correction scheme (1100) (e.g., as illustrated in FIG. 11), a first z-rotation correction scheme (1200) (e.g., as illustrated in FIG. 12), an x-rotation centripetal force correction scheme (1300) (e.g., as illustrated in FIG. 13), and a second z-rotation correction scheme (1400) (e.g., as illustrated in FIG. 14).

For example, the sensor 105 and the actuator 115 may be separated by a distance in the electronic device. In addition, a serial communication protocol of the electronic device may cause a communication delay between the sensor 105 and the actuator 115. As a result, there may be a sizeable difference between the acceleration signal detected by the sensor 105 and the acceleration signal applied to the lens 142. In addition, offset errors and/or biases may be introduced into the various components of the system, which may further influence the optical image stabilization system and/or a position of the lens.

Given that the actuator control circuit 120 may perform a variety of operations on the acceleration signal detected by the sensor 105, any communication delays between the sensor 105 and the actuator 115 and/or DC offset errors and/or biases introduced into the various components of the system may result in a mismatch between the drive signal $S_{DR}$ that is generated by the actuator control circuit 120 and the desired drive signal $S_{DR}$. Given that the drive signal $S_{DR}$ may correspond to a particular current value applied to the actuator 115, when a particular lens position is desired, the actual amount of current required by the actuator 115 to move the lens 142 to the target position may be different than the current value specified by the position instruction value issued by the processor 110. Consequently, a distance between the sensor 105 and the actuator 115 may cause an under correction of the lens position or an over correction of the lens position.

The first addition circuit 182a may configured to generate a first summed signal $S_{SUM\_1}$ according to the x-component of the acceleration signal $S_{ACC}$, the first corrected output signal $S_{OUT\_CORR\_1}$, and the first z-rotational correction output signal $S_{ZRC\_OUT\_1}$. For example, the first addition circuit 182a may add the x-component of acceleration signal $S_{ACC}$, the first corrected output signal $S_{OUT\_CORR\_1}$, and the first z-rotational correction output signal $S_{ZRC\_OUT\_1}$ to each other before transmitting the sum, in the form of the first summed signal $S_{SUM\_1}$ to a first inertial force cancellation circuit 190a for further processing.

The third addition circuit 182b may be configured to generate a second summed signal $S_{SUM\_2}$ according to the y-component of the acceleration signal $S_{ACC}$, the fourth corrected output signal $S_{OUT\_4\_CORR}$, and the second z-rotational correction output signal $S_{ZRC\_OUT\_2}$. For example, the third addition circuit 182b may add the y-component of acceleration signal $S_{ACC}$, the fourth corrected output signal $S_{OUT\_4\_CORR}$, and the second z-rotational correction output signal $S_{ZRC\_OUT\_2}$ to each other before transmitting the sum, in the form of the second summed signal $S_{SUM\_2}$ to a second inertial force cancellation circuit 190b for further processing.

The first circuit portion 121 and the second circuit portion 122 may each be configured to receive and process the velocity signal $S_{VEL}$ and the acceleration signal $S_{ACC}$. The first circuit portion 121 may be further configured to receive the first summed signal $S_{SUM\_1}$ and generate the first drive signal $S_{DR\_1}$ according to the first summed signal $S_{SUM\_1}$, velocity signal $S_{VEL}$, and acceleration signal $S_{ACC}$. The second circuit portion 122 may be further configured to receive the second summed signal $S_{SUM\_2}$ and generate the second drive signal $S_{DR\_2}$ according to the second summed signal $S_{SUM\_2}$, velocity signal $S_{VEL}$, and acceleration signal $S_{ACC}$.

In various embodiments, the first circuit portion 121 may further comprise the first inertial force correction circuit 190a, a first gyro filter 155a, and a first acceleration filter 156a. The second circuit portion 122 may further comprise the second inertial force correction circuit 190b, a second gyro filter 155b, and a second acceleration filter 156b.

In various embodiments, the first inertial force cancellation circuit 190a may comprise an input terminal connected to an output terminal of the first addition circuit 182a. The first inertial force cancellation circuit 190a may be configured to receive the first summed signal $S_{SUM\_1}$ and apply a gain to the summed signal $S_{SUM\_1}$ based on the x-component of the target position of the lens 142 to compensate for the effect that gravity and the disturbance signal 128 has on various components in the system 100, such as the lens 142.

The first inertial force cancellation circuit 190a may be further configured to generate a first inertial force correction signal $S_{IFC\_OUT\_1}$ according to the first summed signal $S_{SUM\_1}$. For example, the inertial force cancellation circuit 190a may amplify the first summed signal $S_{SUM\_1}$ by one or more predetermined coefficients to match the amplitude of the first drive signal $S_{DR\_1}$ that is needed to produce the requisite first driving force $F_{DR\_1}$ to cancel out the x-component of the inertial force applied to the lens 142 by gravity and the disturbance signal 128. The first inertial force cancellation circuit 190a may be further configured to transmit the first inertial force correction signal $S_{IFC\_OUT\_1}$ to a fifth addition circuit 184a for additional processing.

In various embodiments, the second inertial force cancellation circuit 190b may comprise an input terminal connected to an output terminal of the third addition circuit 182b. The second inertial force cancellation circuit 175b may be configured to receive the second summed signal $S_{SUM\_2}$ and apply a gain to the second summed signal $S_{SUM\_2}$ based on the y-component of the target position of the lens 142 to compensate for the effect that gravity and the disturbance signal 128 has on various components in the system 100, such as the lens 142.

The second inertial force cancellation circuit 190b may be further configured to generate a second inertial force correction signal $S_{IFC\_OUT\_2}$ according to the second summed signal $S_{SUM\_2}$. For example, the second inertial force cancellation circuit 190b may amplify the second summed signal $S_{SUM\_2}$ by one or more predetermined coefficients to match the amplitude of the second drive signal $S_{DR\_2}$ that is needed to produce the requisite second driving force $F_{DR\_2}$ to cancel out the y-component of the inertial force applied to the lens 142 by gravity and the disturbance signal 128. The second inertial force cancellation circuit 190b may be further configured to transmit the second inertial force correction signal $S_{IFC\_OUT\_2}$ to a sixth addition circuit 184b for additional processing.

Each inertial force cancellation circuit 190a, 190b may be configured to perform various functions, such as filtering, amplification, signal conversion, analysis and the like, to compensate for the effect that gravity and the disturbance signal 128 has on various components in the system 100. The inertial force cancellation circuits 190a, 190b may comprise one or more suitable filters capable of attenuating various frequencies of the first and second summed signals $S_{SUM\_1}$, $S_{SUM\_2}$ in order to substantially eliminate any phase offset error present in the first and second summed signals $S_{SUM\_1}$, $S_{SUM\_2}$, such as a low-boost filter, a high-boost filter, or the like. The inertial force correction circuits 190a, 190b may also comprise any suitable signal gain controller capable of amplifying the summed signals $S_{SUM\_1}$, $S_{SUM\_2}$, such as an attenuator, gain circuit, or the like.

Figure 15:
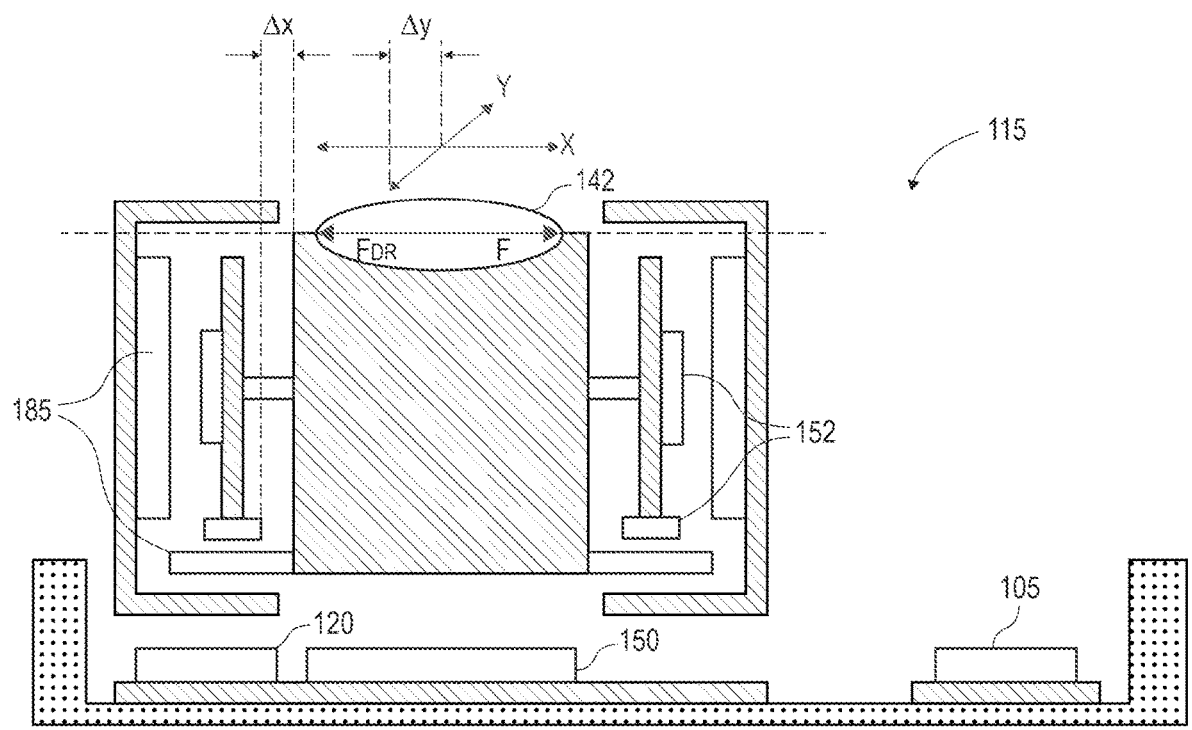
FIG. 15 representatively illustrates an actuator in accordance with an embodiment of the present technology.

As an example, and referring now to FIG. 15, the dashed line shows a state in which the inertial force correction is not enabled. When the system 100 is acted upon by the disturbance signal 128, the lens 142 may experience the inertial force, F. If the correction is not enabled, the lens 142 may, for example, deviate by $\Delta x$ and/or $\Delta y$ from the target position. Given a particular position instruction value associated with a respective target position, the actual lens position may not be equal to the target position. The position instruction value may correspond to a particular current value applied to the actuator 115, so when a particular lens position is desired, the actual amount of current required by the actuator 115 may be different than the one specified by the position instruction value, which may be further exacerbated by a non-negligible distance between the sensor 105 and the actuator 115.

According to various embodiments, the system 100 may further comprise a memory (not shown) configured to store the computed correction gain values $A_1$ through $A_{12}$. The memory may comprise a flash memory or any other suitable memory type. In addition, the memory may be integrated within the actuator control circuit 120, or alternatively, may be formed on a companion circuit that is accessible to the actuator control circuit 120.

The gyro filters 155a, 155b and the acceleration filters 156a, 156b may perform various functions on a signal (e.g., the velocity signal $S_{VEL}$ and the acceleration signal $S_{ACC}$), such as integration and frequency characteristic adjustment (i.e., DC cutting). For example, the gyro filters 155a, 155b and the acceleration filters 156a, 156b may integrate an angular velocity of the velocity signal $S_{VEL}$ and an angular acceleration of the acceleration signal $S_{ACC}$, respectively, and prevent transmission of the signals at undesired frequencies. The gyro filters 155a, 155b and the acceleration filters 156a, and 156b may be connected between the sensor 105 and the first and second driver circuits 181a, 181b. In various embodiments, the gyro filters 155a, 155b and the acceleration filters 156a, 156b may each comprise an interface (I/F) circuit (not shown) and an integrator circuit (not shown). The gyro filters 155a, 155b and the acceleration filters 156a, 156b may operate in conjunction with each other to calculate the target position of the lens 142.

In various embodiments, each gyro filter 155a, 155b may comprise an input terminal and may be configured to receive one of the x- and y-components of the velocity signal $S_{VEL}$. Each gyro filter 155a, 155b may be configured to utilize one of the x- and y-components of the velocity signal $S_{VEL}$ to generate a respective output signal. For example, the first gyro filter 155a may be configured to receive the y-component of the velocity signal $S_{VEL}$ and generate a first gyro filter output signal $S_{GF\_OUT\_1}$ according to the y-component of the velocity signal $S_{VEL}$. Similarly, the second gyro filter 155b may be configured to receive the x-component of the velocity signal $S_{VEL}$ and generate a second gyro filter output signal $S_{GF\_OUT\_2}$ according to the x-component of the velocity signal $S_{VEL}$.

Each gyro filter output signal $S_{GF\_OUT\_1}$, $S_{GF\_OUT\_2}$ may control a current or a voltage in the actuator 115, which may control the movement of the actuator 115. Accordingly, the movement of the actuator 115 (or a portion of the actuator 115) may be proportional to the magnitude of each gyro filter output signal $S_{GF\_OUT\_1}$, $S_{GF\_OUT\_2}$. Each gyro filter output signal $S_{GF\_OUT\_1}$, $S_{GF\_OUT\_2}$ may comprise any suitable drive signal, such as current signals, voltage signals, and the like. The first gyro filter 155a may be further configured to transmit the first gyro filter output signal $S_{GF\_OUT\_1}$ to another portion and/or sub-circuit of the actuator control circuit 120, such as a first linearity correction circuit 157a, for further processing. The first linearity correction circuit 157a may apply a gain to the first gyro filter output signal $S_{GF\_OUT\_1}$.

Similarly, the second gyro filter 155b may be further configured to transmit the second gyro filter output signal $S_{GF\_OUT\_2}$ to another portion and/or sub-circuit of the actuator control circuit 120, such as a second linearity correction circuit 157b, for further processing. The second linearity correction circuit 157b may apply a gain to the second gyro filter output signal $S_{GF\_OUT\_2}$.

As an example, each gyro filter 155a, 155b may convert one of the x- and y-components of the velocity signal $S_{VEL}$ to a respective shake angle, where each shake angle may be associated with one of the x- and y-components of the velocity signal $S_{VEL}$. The gyro filters 155a, 155b may determine the target position of the lens 142 in each direction according to their respective shake angles. For example, the first gyro filter 155a may receive the y-component of the velocity signal $S_{VEL}$ and compute an integration to generate its respective shake angle. The first gyro filter 155a may then determine the target position of the lens 142 in the x-axis direction according to the calculated shake angle. The first gyro filter 155a may transmit the target position, in the form of the first gyro filter output signal $S_{GF\_OUT\_1}$, to another portion of the actuator control circuit 120, such as the first linearity correction circuit 157a, for additional processing.

Each acceleration filter 156a, 156b may comprise an input terminal and is configured to receive one of the x- and y-components of the acceleration signal $S_{ACC}$. For example, the first acceleration filter 156a may be configured to receive the x-component of the acceleration signal $S_{ACC}$, while the second acceleration filter 156b may be configured to receive the y-component of the acceleration signal $S_{ACC}$.

In various embodiments, the acceleration filters 156a, 156b may be configured to utilize one of the x- and y-components of the acceleration signal $S_{ACC}$ to generate a respective output signal. For example, the first acceleration filter 156a may be configured to generate a first acceleration filter output signal $S_{AF\_OUT\_1}$ according to the x-component of the acceleration signal $S_{ACC}$. Similarly, the second acceleration filter 156b may be configured to generate a second acceleration filter output signal $S_{AF\_OUT\_2}$ according to the y-component of the acceleration signal $S_{ACC}$.

Each acceleration filter output signal $S_{AF\_OUT\_1}$, $S_{AF\_OUT\_2}$ may control a current or a voltage in the actuator 115, which may control the movement of the actuator 115. Accordingly, the movement of the actuator 115 (or a portion of the actuator 115) may be proportional to the magnitude of each acceleration filter output signal $S_{AF\_OUT\_1}$, $S_{AF\_OUT\_2}$. Each acceleration filter output signal $S_{AF\_OUT\_1}$, $S_{AF\_OUT\_2}$ may comprise any suitable drive signal, such as current signals, voltage signals, and the like. The first acceleration filter 156a may be further configured to transmit the first acceleration filter output signal $S_{AF\_OUT\_1}$ to another portion and/or sub-circuit of the actuator control circuit 120, such as the first gyro filter 155a, for further processing. Similarly, the second acceleration filter 156b may be further configured to transmit the second acceleration filter output signal $S_{AF\_OUT\_2}$ to another portion and/or sub-circuit of the actuator control circuit 120, such as the second gyro filter 155b, for further processing.

As an example, the acceleration filters 156a, 156b may perform a double-integration of the x- and y-components of the acceleration signal $S_{ACC}$ to generate a respective position signal of the lens 142. The position signal may be used to compute a deviation from the target position. The acceleration filters 156a, 156b may transmit their respective computed deviations, in the form of the acceleration filter output signals $S_{AF\_OUT\_1}$, $S_{AF\_OUT\_2}$, respectively, to another portion of the actuator control circuit 120, such as the gyro filters 155a, 155b where the computed deviations may be used to determine the target position to be set for the lens 142 in the x- and y-axis directions. Each target position may be relative to a reference point on the x-y-z reference coordinate system and gravity.

In operation, generating the drive signal $S_{DR}$ may comprise receiving the first input signal, such as the velocity signal $S_{VEL}$, and the second input signal, such as the acceleration signal $S_{ACC}$, from the gyro sensor 106 and the acceleration sensor 107, respectively. Generating the drive signal $S_{DR}$ may further comprise generating one or more offset-corrected signals based on the first input signal and one or more offset-corrected signals based on the second input signal. Generating the drive signal $S_{DR}$ may further comprise generating one or more phase-corrected signals according to the one or more offset-corrected signals generated based on the first input signal. Generating the drive signal $S_{DR}$ may further comprise generating one or more phase-corrected signals according to the one or more offset-corrected signals generated based on the second input signal.

Generating the drive signal $S_{DR}$ may further comprise: generating a plurality of output signals according to the one or more phase-corrected signals; computing a plurality of correction gain values according to the position of the sensor 105 and the actuator 115; and applying the plurality of correction gain values to the plurality of output signals. Generating the drive signal $S_{DR}$ may further comprise generating the drive signal $S_{DR}$ according to the amplified output signals and the second input signal.

Referring now to FIGS. 11-14, at the system start, a signal, such as the disturbance signal 128, may be applied to the system 100 in an x, y-, and/or z-axis direction. The sensor 105 may detect the disturbance signal 128 and generate a signal from the detected disturbance signal 128. The signal may comprise the first input signal corresponding to an angular velocity of the device (i.e., the velocity signal $S_{VEL}$) and/or the second input signal corresponding to an acceleration of the device (i.e., the acceleration signal $S_{ACC}$). The velocity signal $S_{VEL}$ may comprise first x-, y-, and z-components, and the acceleration signal $S_{ACC}$ may comprise second x- and y-components.

The gyro sensor 106 may transmit the velocity signal $S_{VEL}$ to the actuator control circuit 120 for processing, and the acceleration sensor 107 may transmit the acceleration signal $S_{ACC}$ to the actuator control circuit 120 for processing. For example, the y-component of the velocity signal $S_{VEL}$ may be transmitted to the first offset correction circuit 160a, the x-component of the velocity signal $S_{VEL}$ may be transmitted to the third offset correction circuit 160c, and the z-component of the velocity signal $S_{VEL}$ may be transmitted to the second offset correction circuit 160b and the fourth offset correction circuit 160d.

At this time, the system 100 may perform the y-rotation centripetal force correction scheme (1100) (e.g., as illustrated in FIG. 11), the first z-rotation correction scheme (1200) (e.g., as illustrated in FIG. 12), the x-rotation centripetal force correction scheme (1300) (e.g., as illustrated in FIG. 13), and the second z-rotation correction scheme (1400) (e.g., as illustrated in FIG. 14).

According to an exemplary embodiment, and referring now to FIG. 11, upon receiving the y-component of the velocity signal (1105), the first offset correction circuit 160a may start calibrating the drive signal $S_{DR}$ by correcting the DC offset errors and/or biases present in the y-component of the velocity signal $S_{VEL}$ (1110). To correct for the DC offset errors and/or biases according to certain embodiments, it may be desired that a DC offset error and/or bias of zero be sustained.

Accordingly, the first offset correction circuit 160a may receive the y-component of the velocity signal $S_{VEL}$ and generate the first offset-corrected signal $S_{OC\_1}$ according to the y-component of the velocity signal $S_{VEL}$. The first offset correction circuit 160a may generate the first offset-corrected signal $S_{OC\_1}$ by subtracting a signal equal in magnitude to the DC offset error and/or bias from the y-component of the velocity signal $S_{VEL}$.

The magnitude of each DC offset error and/or bias may be determined in any suitable manner. For example, the magnitude of the DC offset errors and/or biases may be predetermined using any suitable calibration method, such as by measuring the amplitude of signals detected by the gyro sensor 106 when the gyro sensor 106 is operating in a reference state (i.e., where the gyro sensor 106 is not being acted upon by the disturbance signal 128). Because the gyro sensor 106 is not being acted upon by the disturbance signal 128 during the reference state, signals that are detected may be considered the noise signals.

It will be appreciated that a large number of noise readings may be taken from the gyro sensor 106 such that an average amplitude of the noise signals may be determined to more accurately determine the magnitude of the offset errors and/or biases.

After the first offset correction circuit 160a generates the first offset-corrected signal $S_{OC\_1}$, the first offset correction circuit 160a may transmit the first offset-corrected signal $S_{OC\_1}$ to the first phase correction circuit 165a for additional processing.

Upon receiving the first offset-corrected signal $S_{OC\_1}$ by the first phase correction circuit 165a, the first offset-corrected signal $S_{OC\_1}$ may comprise a phase offset error. In other words, the first offset-corrected signal $S_{OC\_1}$ may be shifted in phase with respect to the y-component of the velocity signal $S_{VEL}$ supplied to the first offset correction circuit 160a from the gyro sensor 106. Accordingly, calibrating the drive signal $S_{DR}$ may further comprise correcting the phase offset error present in the first offset-corrected signal $S_{OC\_1}$.

Upon receiving the first offset-corrected signal $S_{OC\_1}$ from the first offset correction circuit 160a, the first phase correction circuit 165a may correct the phase offset error present in the first offset-corrected signal $S_{OC\_1}$ (1115). For example, the first phase correction circuit 165a may apply any suitable phase compensation technique to generate the first phase-corrected signal $S_{PC\_1}$ according to the first offset-corrected signal $S_{OC\_1}$.

To correct the first offset-corrected signal $S_{OC\_1}$ according to certain embodiments, it may be desired that a phase offset error of zero be sustained. Accordingly, the first phase correction circuit 165a, which may comprise one or more IIR filters, or the like, may shift the first offset-corrected signal $S_{OC\_1}$ in phase by an amount equal to the phase offset error. The first phase correction circuit 165a may then transmit the phase-shifted first offset-corrected signal $S_{OC\_1}$, in the form of the first phase-corrected signal $S_{PC\_1}$, to the first calculation circuit 170a for further processing.

Upon receiving the first phase-corrected signal $S_{PC\_1}$ from the first calculation circuit 170a, generating the drive signal $S_{DR}$ may further comprise generating a first output signal $S_{OUT\_1}$ according to the first phase-corrected signal $S_{PC\_1}$, via the first calculation circuit 170a. At this time, the first calculation circuit 170a may compute a square of the first phase-corrected signal $S_{PC\_1}$ (1120). The first calculation circuit 170a may then transmit the computed square of the first phase-corrected signal $S_{PC\_1}$, in the form of the first output signal $S_{OUT\_1}$, to the first gain circuit 175a for further processing. In an exemplary embodiment, the first output signal $S_{OUT\_1}$ may be described by Equation 1 above.

At this time, and referring now to FIG. 9, the sensor 105 may be located at the distance $\Delta d_S$ from the center of rotation (i.e., the reference point) and the actuator 115 may be located at the distance $\Delta d_A$ from the center of rotation. The center of rotation may be defined by coordinates ($X_0$, $Y_0$, $Z_0$).

The distance $\Delta d_S$ may form a sensor angle $\theta_S$ with respect to the x-axis of the defined x-y-z coordinate system. Accordingly, the sensor 105 may be located at coordinates ($X_S$, $Y_S$, $Z_0$), where coordinate $X_S$ may be described by the following equation:

$$X_S = R_S * \cos \theta_S \quad \text{(Equation 7)}$$

and where coordinate $Y_S$ may be described by the following equation:

$$Y_S = R_S * \cos \theta_S \quad \text{(Equation 8)}$$

Similarly, the distance $\Delta d_A$ may form an actuator angle $\theta_A$ with respect to the x-axis of the defined x-y-z coordinate system. Accordingly, the actuator 115 may be located at coordinates ($X_A$, $Y_A$, $Z_0$), where coordinate $X_A$ may be described by the following equation:

$$X_A = R_A * \cos \theta_A \quad \text{(Equation 9)}$$

where coordinate $Y_A$ may be described by the following equation:

$$Y_A = R_A * \cos \theta_A \quad \text{(Equation 10)}$$

Coordinate $X_S$ may represent a distance between the sensor 105 and the center of rotation and coordinate $X_A$ may represent a distance between the actuator 115 and the center of rotation.

It will be appreciated that coordinates ($X_S$, $Y_S$, $Z_0$) may be different than coordinates ($X_A$, $Y_A$, $Z_0$). It will also be appreciated that the reference position may be defined as the center of rotation of the electronic device. It will be further appreciated that the reference coordinates may be any suitable coordinates.

After the first gain circuit 175a receives the first output signal $S_{OUT\_1}$ from the first calculation circuit 170a, generating the drive signal $S_{DR}$ may further comprise storing in the memory (not shown) and/or transmitting the first correction gain $A_1$ to the first gain circuit 175a.

The first correction gain $A_1$, which may be predetermined, may be determined according to the first distance between the sensor 105 and the actuator 115. The first distance may be along a direction of the x-axis and may be determined according to the first relative position of the sensor 105 with respect to the actuator 115. The first relative position may be determined according to the x-axis coordinates of the sensor 105 and the actuator 115, $X_S$ and $X_A$, respectively. Because the first correction gain $A_1$ is determined according to the first relative position of the sensor 105 with respect to the actuator 115, the first correction gain $A_1$ may be determined regardless of where the center of rotation is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the first correction gain $A_1$ may be proportional to the first distance.

It will also be appreciated that the first correction gain $A_1$ may depend upon the type of sensor 105 being used in the system 100, the sensitivity values associated with the angular velocity and acceleration signals applied to the system 100, and the layout of the sensor 105 and the actuator 115 on the substrate.

Generating the first drive signal $S_{DR}$ may further comprise applying the first correction gain $A_1$ to the first output signal $S_{OUT\_1}$ (1125), via the first gain circuit 175a. After the first correction gain $A_1$ is applied to the first output signal $S_{OUT\_1}$, the resulting first corrected output signal $S_{OUT\_CORR\_1}$ may be transmitted to the second gain circuit 175b, where the second correction gain $A_2$ may be applied to the first corrected output signal $S_{OUT\_CORR\_1}$.

It will be appreciated that the second correction gain $A_2$ may change across each module that is manufactured. As an example, each module may be defined by its own characteristics, such as the mass of the lens 142, the magnetic flux density B associated with the coil 152, and the length L of the coil 152. Given that the values of m, B, and L may fluctuate across the different modules that are manufactured, the second correction gain $A_2$ may change across the different modules.

After the second correction gain $A_2$ is applied to the first corrected output signal $S_{OUT\_CORR\_1}$, via the second gain circuit 175b, the resulting amplified first corrected output signal $S_{OUT\_CORR\_1}$ may then be transmitted to another circuit component, such as the first addition circuit 182a for further processing.

At this time, the resulting amplified first corrected output signal $S_{OUT\_CORR\_1}$ and the x-component of the acceleration signal $S_{ACC}$ may be added to each other (1130), via the first addition circuit 182a.

After completion of the y-rotation centripetal force correction process, another iteration of a program loop may be executed by the system 100 (1135).

While the system 100 is performing the y-rotation centripetal force correction process (i.e., steps 1100 to 1135), the system 100 may simultaneously perform the first z-rotation correction scheme. Alternatively, the system may perform the y-rotation centripetal force correction process (i.e., steps 1100 to 1135) before or after the first z-rotation correction scheme.

According to an exemplary embodiment, and referring now to FIG. 12, upon receiving the z-component of the velocity signal $S_{VEL}$ (1205), the second offset correction circuit 160b may start calibrating the drive signal $S_{DR}$ by correcting the DC offset errors and/or biases present in the z-component of the velocity signal $S_{VEL}$ (1210). To correct for the DC offset errors and/or biases according to certain embodiments, it may be desired that a DC offset error and/or bias of zero be sustained.

Accordingly, the second offset correction circuit 160b may receive the z-component of the velocity signal $S_{VEL}$ and generate the second offset-corrected signal $S_{OC\_2}$ according to the z-component of the velocity signal $S_{VEL}$. The second offset correction circuit 160b may generate the second offset-corrected signal $S_{OC\_2}$ by subtracting a signal equal in magnitude to the DC offset error and/or bias from the z-component of the velocity signal $S_{VEL}$. The magnitude of the DC offset error and/or bias may be determined in any suitable manner, such as discussed above.

After the second offset correction circuit 160b generates the second offset-corrected signal $S_{OC\_2}$, the second offset correction circuit 160b may transmit the second offset-corrected signal $S_{OC\_2}$ to the second phase correction circuit 165b for additional processing.

Upon receiving the second offset-corrected signal $S_{OC\_2}$ by the second phase correction circuit 165b, the second offset-corrected signal $S_{OC\_2}$ may comprise a phase offset error. In other words, the second offset-corrected signal $S_{OC\_2}$ may be shifted in phase with respect to the z-component of the velocity signal $S_{VEL}$ supplied to the second offset correction circuit 160b from the gyro sensor 106. Accordingly, calibrating the drive signal $S_{DR}$ may further comprise correcting the phase offset error present in the second offset-corrected signal $S_{OC\_2}$.

Upon receiving the second offset-corrected signal $S_{OC\_2}$ from the second offset correction circuit 160b, the second phase correction circuit 165b may correct the phase offset error present in the second offset-corrected signal $S_{OC\_2}$ (1215). For example, the second phase correction circuit 165b may apply any suitable phase compensation technique, such as discussed above, to generate the second phase-corrected signal $S_{PC\_2}$ according to the second offset-corrected signal $S_{OC\_2}$.

The second phase correction circuit 165b may then transmit the phase-shifted second offset-corrected signal $S_{OC\_2}$, in the form of the second phase-corrected signal $S_{PC\_2}$, to the second calculation circuit 170b and the third calculation circuit 170c for further processing.

Upon receiving the second phase-corrected signal $S_{PC\_2}$ from the second calculation circuit 170b, generating the drive signal $S_{DR}$ may further comprise generating a second output signal $S_{OUT\_2}$ according to the second phase-corrected signal $S_{PC\_2}$, via the second calculation circuit 170b. At this time, the second calculation circuit 170b may compute a square of the second phase-corrected signal $S_{PC\_2}$ (1220a). The second calculation circuit 170b may then transmit the computed square of the second phase-corrected signal $S_{PC\_2}$, in the form of the second output signal $S_{OUT\_2}$, to the third gain circuit 175c for further processing. In an exemplary embodiment, the second output signal $S_{OUT\_2}$ may be described by Equation 2 above.

After the third gain circuit 175c receives the second output signal $S_{OUT\_2}$ from the second calculation circuit 170b, generating the drive signal $S_{DR}$ may further comprise storing in the memory (not shown) and/or transmitting the third correction gain $A_3$ to the third gain circuit 175c.

The third correction gain $A_3$, which may be predetermined, may be determined according to the second distance between the sensor 105 and the actuator 115. The second distance may be along a direction of the x-axis and may be determined according to the second relative position of the sensor 105 with respect to the actuator 115. The second relative position may be determined according to the x-axis coordinates of the sensor 105 and the actuator 115, $X_S$, $X_A$, respectively. Because the third correction gain $A_3$ is determined according to the second relative position of the sensor 105 with respect to the actuator 115, the third correction gain $A_3$ may be determined regardless of where the center of rotation is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the third correction gain $A_3$ may be proportional to the second distance.

It will also be appreciated that the third correction gain $A_3$ may depend upon the type of sensor 105 being used in the system 100, the sensitivity values associated with the angular velocity and acceleration signals applied to the system 100, and the layout of the sensor 105 and the actuator 115 on the substrate.

Generating the drive signal $S_{DR}$ may further comprise applying the third correction gain $A_3$ to the second output signal $S_{OUT\_2}$ (1225a), via the third gain circuit 175c. After the third correction gain $A_3$ is applied to the second output signal $S_{OUT\_2}$, the resulting second corrected output signal $S_{OUT\_CORR\_2}$ may be transmitted to the fourth gain circuit 175d, where the fourth correction gain $A_4$ may be applied to the second corrected output signal $S_{OUT\_CORR\_2}$.

In some embodiments, the fourth correction gain $A_4$ may be equal to the second correction gain $A_2$. In other embodiments, the fourth correction gain $A_4$ may not be equal to the second correction gain $A_2$.

After the fourth correction gain $A_4$ is applied to the second corrected output signal $S_{OUT\_CORR\_2}$, via the fourth gain circuit 175d, the resulting amplified second corrected output signal $S_{OUT\_CORR\_2}$ may then be transmitted to another circuit component, such as the second addition circuit 179a for further processing.

While the system 100 is performing steps 1220a to 1225a, the system 100 may simultaneously perform steps 1220b to 1225b. Alternatively, the system 100 may perform steps 1220a to 1225a before or after steps 1220b to 1225b. Generating the drive signal $S_{DR}$ may further comprise generating a third output signal $S_{OUT\_3}$ according to the second phase-corrected signal $S_{PC\_2}$. At this time, the third calculation circuit 170c may compute a first derivative of the second phase-corrected signal $S_{PC\_2}$ (1220b). The third calculation circuit 170c may then transmit the computed first derivative of the second phase-corrected signal $S_{PC\_2}$, in the form of the third output signal $S_{OUT\_3}$, to the fifth gain circuit 175e for further processing. In an exemplary embodiment, the third output signal $S_{OUT\_3}$ may be described by Equation 3 above. After the fifth gain circuit 175e receives the third output signal $S_{OUT\_3}$ from the third calculation circuit 170c, generating the drive signal $S_{DR}$ may further comprise storing in the memory (not shown) and/or transmitting the fifth correction gain $A_5$ to the fifth gain circuit 175e.

The fifth correction gain $A_5$, which may be predetermined, may be determined according to the third distance between the sensor 105 and the actuator 115. The third distance may be along a direction of the y-axis and may be determined according to the third relative position of the sensor 105 with respect to the actuator 115. The third relative position may be determined according to the y-axis coordinates of the sensor 105 and the actuator 115, namely $Y_S$, $Y_A$. Because the fifth correction gain $A_5$ is determined according to the third relative position of the sensor 105 with respect to the actuator 115, the fifth correction gain $A_5$ may be determined regardless of where the center of rotation is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the fifth correction gain $A_5$ may be proportional to the third distance.

It will also be appreciated that the fifth correction gain $A_5$ may depend upon the type of sensor 105 being used in the system 100, the sensitivity values associated with the angular velocity and acceleration signals applied to the system 100, and the layout of the sensor 105 and the actuator 115 on the substrate.

Generating the first drive signal $S_{DR}$ may further comprise applying the fifth correction gain $A_5$ to the third output signal $S_{OUT\_3}$ (1225b), via the fifth gain circuit 175e. After the fifth correction gain $A_5$ is applied to the third output signal $S_{OUT\_3}$, the resulting third corrected output signal $S_{OUT\_CORR\_3}$ may be transmitted to the sixth gain circuit 175f, where the sixth correction gain $A_6$ may be applied to the third corrected output signal $S_{OUT\_CORR\_6}$.

In some embodiments, the sixth correction gain $A_6$ may be equal to the second correction gain $A_2$. In other embodiments, the sixth correction gain $A_6$ may not be equal to the second correction gain $A_2$.

After the sixth correction gain $A_6$ is applied to the third corrected output signal $S_{OUT\_3\_CORR}$, the resulting amplified corrected third output signal $S_{OUT\_3\_CORR}$ may be transmitted to another circuit component, such as the second addition circuit 179a for further processing.

At this time, the amplified second corrected output signal $S_{OUT\_CORR\_2}$ and the amplified corrected third output signal $S_{OUT\_CORR\_3}$ may be added to each other (1230), via the second addition circuit 179a. The second addition circuit 179a may then transmit the resulting sum, in the form of the first z-rotational correction output signal $S_{ZRC\_OUT\_1}$, to the first addition circuit 182a where the first z-rotational correction output signal $S_{ZRC\_OUT\_1}$ may be added to the first corrected output signal $S_{OUT\_CORR\_1}$ and the x-component of the acceleration signal $S_{ACC}$ (1135) before being transmitted, in the form of the first summed signal $S_{SUM\_1}$, to the first inertial force cancellation circuit 190a for further processing.

After completion of the first z-rotation correction scheme, another iteration of a program loop may be executed by the system 100 (1240).

While the system 100 is performing the y-rotation centripetal force correction scheme (i.e., steps 1100 to 1135) and the first z-rotation correction scheme (i.e., steps 1200 to 1240), the system 100 may simultaneously perform the x-rotation centripetal force correction scheme. Alternatively, the system 100 may perform the schemes in a sequence.

According to an exemplary embodiment, and referring now to FIG. 13, upon receiving the x-component of the velocity signal $S_{VEL}$ (1305), the third offset correction circuit 160c may start calibrating the drive signal $S_{DR}$ by correcting the DC offset errors and/or biases present in the x-component of the velocity signal $S_{VEL}$(1310). To correct for the DC offset errors and/or biases according to certain embodiments, it may be desired that a DC offset error and/or bias of zero be sustained.

Accordingly, the third offset correction circuit 160c may receive the x-component of the velocity signal $S_{VEL}$ and generate the third offset-corrected signal $S_{OC\_3}$ according to the x-component of the velocity signal $S_{VEL}$. The third offset correction circuit 160c may generate the third offset-corrected signal $S_{OC\_3}$ by subtracting a signal equal in magnitude to the DC offset error and/or bias from the x-component of the velocity signal $S_{VEL}$. The magnitude of the DC offset error and/or bias may be determined in any suitable manner, such as discussed above.

After the third offset correction circuit 160c generates the third offset-corrected signal $S_{OC\_3}$, the third offset correction circuit 160c may transmit the third offset-corrected signal $S_{OC\_3}$ to the third phase correction circuit 165c for additional processing.

Upon receiving the third offset-corrected signal $S_{OC\_3}$ by the third phase correction circuit 165c, the third offset-corrected signal $S_{OC\_3}$ may comprise a phase offset error. In other words, the third offset-corrected signal $S_{OC\_3}$ may be shifted in phase with respect to the x-component of the velocity signal $S_{VEL}$ supplied to the third offset correction circuit 160c from the gyro sensor 106. Accordingly, calibrating the drive signal $S_{DR}$ may further comprise correcting the phase offset error present in the third offset-corrected signal $S_{OC\_3}$.

Upon receiving the third offset-corrected signal $S_{OC\_3}$ from the third offset correction circuit 160c, the third phase correction circuit 165c may correct the phase offset error present in the third offset-corrected signal $S_{OC\_3}$ (1315). For example, the third phase correction circuit 165c may apply any suitable phase compensation technique, such as discussed above, to generate the third phase-corrected signal $S_{PC}\_3$ according to the third offset-corrected signal $S_{OC\_3}$.

The third phase correction circuit 165c may then transmit the third phase-shifted offset-corrected signal $S_{OC\_3}$, in the form of the third phase-corrected signal $S_{PC\_3}$, to the fourth calculation circuit 170d for further processing.

Upon receiving the third phase-corrected signal $S_{PC\_3}$ from the third phase correction circuit 165c, generating the drive signal $S_{DR}$ may further comprise generating the fourth output signal $S_{OUT\_4}$ according to the third phase-corrected signal $S_{PC\_3}$, via the fourth calculation circuit 170d. At this time, the fourth calculation circuit 170d may compute a square of the third phase-corrected signal $S_{PC\_3}$ (1320). The fourth calculation circuit 170d may then transmit the computed square of the third phase-corrected signal $S_{PC\_3}$, in the form of the fourth output signal $S_{OUT\_4}$, to the seventh gain circuit 175g for further processing. In an exemplary embodiment, the fourth output signal $S_{OUT\_4}$ may be described by Equation 4 above. After the seventh gain circuit 175g receives the fourth output signal $S_{OUT\_4}$ from the fourth calculation circuit 170d, generating the drive signal $S_{DR}$ may further comprise storing in the memory (not shown) and/or transmitting the seventh correction gain $A_7$ to the seventh gain circuit 175g.

The seventh correction gain $A_7$, which may be predetermined, may be determined according to the fourth distance between the sensor 105 and the actuator 115. The fourth distance may be along a direction of the y-axis and may be determined according to the fourth relative position of the sensor 105 with respect to the actuator 115. The fourth relative position may be determined according to the y-axis coordinates of the sensor 105 and the actuator 115, $Y_S$ and $Y_A$, respectively. Because the seventh correction gain $A_7$ is determined according to the fourth relative position of the sensor 105 with respect to the actuator 115, the seventh correction gain $A_7$ may be determined regardless of where the center of rotation is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the seventh correction gain $A_7$ may be proportional to the fourth distance.

It will also be appreciated that the seventh correction gain $A_7$ may depend upon the type of sensor 105 being used in the system 100, the sensitivity values associated with the angular velocity and acceleration signals applied to the system 100, and the layout of the sensor 105 and the actuator 115 on the substrate.

Generating the drive signal $S_{DR}$ may further comprise applying the seventh correction gain $A_7$ to the fourth output signal $S_{OUT\_4}$ (1325), via the seventh gain circuit 175g. After the seventh correction gain $A_7$ is applied to the fourth output signal $S_{OUT\_4}$, the resulting fourth corrected output signal $S_{OUT\_CORR\_4}$ may be transmitted to the eighth gain circuit 175h, where the eighth correction gain $A_8$ may be applied to the fourth corrected output signal $S_{OUT\_CORR\_4}$.

In some embodiments, the eighth correction gain $A_8$ may be equal to the second correction gain $A_2$. In other embodiments, the eighth correction gain $A_8$ may not be equal to the second correction gain $A_2$.

After the eighth correction gain $A_8$ is applied to the fourth corrected output signal $S_{OUT\_CORR\_4}$, the resulting amplified fourth corrected output signal $S_{OUT\_CORR\_4}$ may be transmitted to another circuit component, such as the third addition circuit 182b for further processing.

At this time, the resulting amplified fourth corrected output signal $S_{OUT\_CORR\_4}$ and the y-component of the acceleration signal $S_{ACC}$ may be added to each other (1330), via the third addition circuit 182b.

After completion of the x-rotation correction process, another iteration of a program loop may be executed by the system 100 (1335).

While the system 100 is performing the x-rotation centripetal force correction process (i.e., steps 1300 to 1335), the system 100 may simultaneously perform the second z-rotation correction scheme. Alternatively, the system 100 may perform the x-rotation centripetal force correction process (i.e., steps 1300 to 1335) before or after the second z-rotation correction scheme According to an exemplary embodiment, and now referring to FIG. 14, upon receiving the z-component of the velocity signal $S_{VEL}$ (1405), the fourth offset correction circuit 160d may start performing the second z-rotation correction scheme by correcting the DC offset errors and/or biases present in the z-component of the velocity signal $S_{VEL}$ (1410). To correct for the DC offset errors and/or biases according to certain embodiments, it may be desired that a DC offset error and/or bias of zero be sustained.

Accordingly, the fourth offset correction circuit 160d may receive the z-component of the velocity signal $S_{VEL}$ and generate a fourth offset-corrected signal $S_{OC\_4}$ according to the z-component of the velocity signal $S_{VEL}$. The fourth offset correction circuit 160d may generate the fourth offset-corrected signal $S_{OC\_4}$ by subtracting a signal equal in magnitude to the DC offset error and/or bias from the z-component of the velocity signal $S_{VEL}$. The magnitude of the DC offset error and/or bias may be determined in any suitable manner, such as discussed above.

After the fourth offset correction circuit 160d generates the fourth offset-corrected signal $S_{OC\_4}$, the fourth offset correction circuit 160d may transmit the fourth offset-corrected signal $S_{OC\_4}$ to the fourth phase correction circuit 165d for additional processing.

Upon receiving the fourth offset-corrected signal $S_{OC\_4}$ by the fourth phase correction circuit 165d, the fourth offset-corrected signal $S_{OC\_4}$ may comprise a phase offset error. In other words, the fourth offset-corrected signal $S_{OC\_4}$ may be shifted in phase with respect to the z-component of the velocity signal $S_{VEL}$ supplied to the fourth offset correction circuit 160d from the gyro sensor 106. Accordingly, calibrating the drive signal $S_{DR}$ may further comprise correcting the phase offset error present in the fourth offset-corrected signal $S_{OC\_4}$.

Upon receiving the fourth offset-corrected signal $S_{OC\_4}$ from the fourth offset correction circuit 160d, the fourth phase correction circuit 165d may correct the phase offset error present in the fourth offset-corrected signal $S_{OC\_4}$ (1415). For example, the fourth phase correction circuit 165d may apply any suitable phase compensation technique, such as discussed above, to generate the fourth phase-corrected signal $S_{PC\_4}$ according to the fourth offset-corrected signal $S_{OC\_4}$.

The fourth phase correction circuit 165d may then transmit the phase-shifted fourth offset-corrected signal $S_{OC\_4}$, in the form of the fourth phase-corrected signal $S_{PC\_4}$, to the fifth calculation circuit 170e and the sixth calculation circuit 170f for further processing.

Upon receiving the fourth phase-corrected signal $S_{PC\_4}$ from the fourth phase correction circuit 165d, generating the drive signal $S_{DR}$ may further comprise generating a fifth output signal $S_{OUT\_5}$ according to the fourth phase-corrected signal $S_{PC\_4}$, via the fifth calculation circuit 170e. At this time, the fifth calculation circuit 170e may compute a square of the fourth phase-corrected signal $S_{PC\_4}$ (1420a). The fifth calculation circuit 170e may then transmit the computed square of the fourth phase-corrected signal $S_{PC\_4}$, in the form of the fifth output signal $S_{OUT\_5}$, to the ninth gain circuit 175i for further processing. In an exemplary embodiment, the fifth output signal $S_{OUT\_5}$ may be described by Equation 5 above.

After the ninth gain circuit 175i receives the fifth output signal $S_{OUT\_5}$ from the fifth calculation circuit 170e, generating the drive signal $S_{DR}$ may further comprise storing in the memory (not shown) and/or transmitting the ninth correction gain $A_9$ to the ninth gain circuit 175i.

The ninth correction gain $A_9$, which may be predetermined, may be determined according to the fifth distance between the sensor 105 and the actuator 115. The fifth distance may be along a direction of the y-axis and may be determined according to the fifth relative position of the sensor 105 with respect to the actuator 115. The fifth relative position may be determined according to the y-axis coordinates of the sensor 105 and the actuator 115, $Y_S$ and $Y_A$, respectively. Because the ninth correction gain $A_9$ is determined according to the fifth relative position of the sensor 105 with respect to the actuator 115, the ninth correction gain $A_9$ may be determined regardless of where the center of rotation is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the ninth correction gain $A_9$ may be proportional to the fifth distance.

It will also be appreciated that the ninth correction gain $A_9$ may depend upon the type of sensor 105 being used in the system 100, the sensitivity values associated with the angular velocity and acceleration signals applied to the system 100, and the layout of the sensor 105 and the actuator 115 on the substrate.

Generating the drive signal $S_{DR}$ may further comprise applying the ninth correction gain $A_9$ to the fifth output signal $S_{OUT\_5}$ (1425a), via the ninth gain circuit 175i. After the ninth correction gain $A_9$ is applied to the fifth output signal $S_{OUT\_5}$, the resulting fifth corrected output signal $S_{OUT\_CORR\_5}$ may be transmitted to the tenth gain circuit 175j, where the tenth correction gain $A_{10}$ may be applied to the fifth corrected output signal $S_{OUT\_CORR\_5}$.

In some embodiments, the tenth correction gain $A_{10}$ may be equal to the second correction gain $A_2$. In other embodiments, the tenth correction gain $A_{10}$ may not be equal to the second correction gain $A_2$.

After the tenth correction gain $A_{10}$ is applied to the fifth corrected output signal $S_{OUT\_CORR\_5}$, the resulting amplified corrected fifth output signal $S_{OUT\_CORR\_5}$ may be transmitted to another circuit component, such as the fourth addition circuit 179b for further processing.

While the system 100 is performing steps 1420a to 1425a, the system 100 may simultaneously perform steps 1420b to 1425b. Alternatively, the system 100 may perform steps 1420a to 1425a before or after steps 1420b to 1425b. Generating the drive signal $S_{DR}$ may further comprise generating a sixth output signal $S_{OUT\_6}$ according to the fourth phase-corrected signal $S_{PC\_4}$. At this time, the sixth calculation circuit 170f may compute a first derivative of the fourth phase-corrected signal $S_{PC\_4}$ (1420b). The sixth calculation circuit 170f may then transmit the computed first derivative of the fourth phase-corrected signal $S_PC$ 4, in the form of the sixth output signal $S_{OUT\_6}$, to the eleventh gain circuit 175k for further processing. In an exemplary embodiment, the sixth output signal $S_{OUT\_6}$ may be described by Equation 6 above. After the third eleventh gain circuit 175k receives the sixth output signal $S_{OUT\_6}$ from the sixth calculation circuit 170f, generating the drive signal $S_{DR}$ may further comprise storing in the memory (not shown) and/or transmitting the eleventh correction gain $A_{11}$ to the eleventh gain circuit 175k.

The eleventh correction gain $A_{11}$, which may be predetermined, may be determined according to the sixth distance between the sensor 105 and the actuator 115. The sixth distance may be along a direction of the x-axis and may be determined according to the sixth relative position of the sensor 105 with respect to the actuator 115. The sixth relative position may be determined according to the x-axis coordinates of the sensor 105 and the actuator 115, $X_S$ and $X_A$, respectively. Because the eleventh correction gain $A_{11}$ is determined according to the sixth relative position of the sensor 105 with respect to the actuator 115, the eleventh correction gain $A_{11}$ may be determined regardless of where the center of rotation is located.

It will be appreciated that in order to correct for a mismatch between the magnitude of the velocity and/or acceleration that is applied to the sensor 105 by the disturbance signal 128 and the magnitude of the velocity and/or acceleration that is ultimately applied to the actuator 115, the eleventh correction gain $A_{11}$ may be proportional to the sixth distance.

It will also be appreciated that the eleventh correction gain $A_{11}$ may depend upon the type of sensor 105 being used in the system 100, the sensitivity values associated with the angular velocity and acceleration signals applied to the system 100, and the layout of the sensor 105 and the actuator 115 on the substrate.

Generating the drive signal $S_{DR}$ may further comprise applying the eleventh correction gain $A_{11}$ to the sixth output signal $S_{OUT\_6}$ (1425b), via the eleventh gain circuit 175k. After the eleventh correction gain $A_{11}$ is applied to the sixth output signal $S_{OUT\_6}$, the resulting sixth corrected output signal $S_{OUT\_CORR\_6}$ may be transmitted to the twelfth gain circuit 175l, where the twelfth correction gain $A_{12}$ may be applied to the sixth corrected output signal $S_{OUT\_CORR\_6}$.

In some embodiments, the twelfth correction gain $A_{12}$ may be equal to the second correction gain $A_2$. In other embodiments, the twelfth correction gain $A_{12}$ may not be equal to the second correction gain $A_2$.

After the twelfth correction gain $A_{12}$ is applied to the sixth output signal $S_{OUT\_CORR\_6}$, the resulting amplified sixth corrected output signal $S_{OUT\_CORR\_6}$ may be transmitted to another circuit component, such as the fourth addition circuit 179b for further processing.

At this time, the amplified fifth corrected output signal $S_{OUT\_CORR\_5}$ and the amplified sixth corrected output signal $S_{OUT\_CORR\_6}$ may be added to each other (1430), via the fourth addition circuit 179b. The fourth addition circuit 179b may then transmit the resulting sum, in the form of the second z-rotational correction output signal $S_{ZRC\_OUT\_2}$, to the third addition circuit 182b, where the second z-rotational correction output signal $S_{ZRC\_OUT\_2}$ may be added to the fourth corrected output signal $S_{OUT\_CORR\_4}$ and the y-component of the acceleration signal $S_{ACC}$ (1135) before being transmitted, in the form of the second summed signal $S_{SUM\_2}$, to the second inertial force cancellation circuit 190b.

After completion of the second z-rotation correction process, another iteration of a program loop may be executed by the system 100 (1440).

After the first inertial force cancellation circuit 190a receives the first summed signal $S_{SUM\_1}$ from the first addition circuit 182a, it may generate the first inertial force correction signal $S_{IFC\_OUT\_1}$ according to the first summed signal $S_{SUM\_1}$. The first inertial force cancellation circuit 190a may then transmit the first inertial force correction signal $S_{IFC\_OUT\_1}$ to the fifth addition circuit 184a for additional processing.

Similarly, after the second inertial force cancellation circuit 190b receives the second summed signal $S_{SUM\_2}$ from the first addition circuit 182a, it may generate the second inertial force correction signal $S_{IFC\_OUT\_2}$ according to the second summed signal $S_{SUM\_2}$. The second inertial force cancellation circuit 190b may then transmit the second inertial force correction signal $S_{IFC\_OUT\_2}$ to the sixth addition circuit 184b for additional processing.

While the system 100 is performing the y-rotation centripetal force correction scheme (i.e., steps 1100 to 1135), the first z-rotation correction scheme (i.e., steps 1200 to 1240), the x-rotation centripetal force correction scheme (i.e., steps 1300 to 1335), and the second z-rotation correction scheme (i.e., steps 1400 to 1440), the gyro filters 155a, 155b and the acceleration filters 156a, 156b may simultaneously perform various functions on the velocity signal $S_{VEL}$ and the acceleration signal $S_{ACC}$, respectively, such as integration and frequency characteristic adjustment. Alternatively, the velocity signal $S_{VEL}$ and the acceleration signal $S_{ACC}$ may be processed in sequence. For example, the gyro filters 155a, 155b and the acceleration filters 156a, 156b may operate in conjunction with each other to calculate the target position of the lens 142.

The gyro filters 155a, 155b may utilize one of the x- and y-components of the velocity signal $S_{VEL}$ to generate their respective gyro filter output signals $S_{GF\_OUT\_1}$, $S_{GF\_OUT\_2}$. The gyro filters 155a, 155b may convert various angular velocity components of the velocity signal $S_{VEL}$ to respective shake angles. Each angular velocity component may be associated with one of the x- and y-components of the velocity signal $S_{VEL}$, and each shake angle may be associated with one angular velocity component. The gyro filters 155a, 155b and the acceleration filters 156a, 156b may then determine a target position of the lens 142 in each direction according to the respective shake angle.

For example, in the case of the y-axis, the gyro filter 155a may compute an integration of the angular velocity around the x-axis to generate its respective shake angle. The gyro filter 155a may then determine the target position of the lens 142 in the y-axis direction according to the calculated shake angle. The gyro filter 155a may then transmit the target position, in the form of the first gyro filter output signal $S_{GF\_OUT\_1}$, to another portion of the actuator control circuit 120, such as the first linearity correction circuit 157a for additional processing.

The acceleration filters 156a, 156b may utilize one of the x- and y-components of the acceleration signal $S_{ACC}$ to generate their respective acceleration filter output signals $S_{AF\_OUT\_1}$, $S_{AF\_OUT\_2}$. For example, the acceleration filters 156a, 156b may simultaneously perform a double-integration of the x- and y-components of the acceleration signal $S_{ACC}$ to generate a position signal of the lens 142. Alternatively, the x- and y-components of the acceleration signal $S_{ACC}$ may be integrated in sequence. The acceleration filters 156a, 156b may use the position signal to compute a deviation from the target reference position. The acceleration filters 156a, 156b may then transmit each computed deviation, in the form of the acceleration filter output signals $S_{AF\_OUT\_1}$, $S_{AF\_OUT\_2}$ to another portion and/or sub-circuit of the actuator control circuit 120 for further processing, such as the gyro filters 155a, 155b, respectively.

The gyro filters 155a, 155b may then transmit their respective gyro filter output signals $S_{GF\_OUT\_1}$, $S_{GF\_OUT\_2}$ to the linearity correction circuits 157a, 157b for further processing.

Upon receiving the first gyro filter output signal $S_{GF\_OUT\_1}$ from the first gyro filter 155a, the first linearity correction circuit 157a may apply a gain to the first gyro filter output signal $S_{GF\_OUT\_1}$ before transmitting the amplified signal, in the form of the first linearity correction output signal $S_{LC\_OUT\_1}$, to the fifth addition circuit 184a, where it may be added to the first inertial force correction signal $S_{IFC\_OUT\_1}$. The fifth addition circuit 184a may then transmit the resulting sum, in the form of the first drive signal $S_{DR\_1}$, to the first driver circuit 181a.

Similarly, upon receiving the second gyro filter output signal $S_{GF\_OUT\_2}$ from the second gyro filter 155b, the second linearity correction circuit 157b may apply a gain to the second gyro filter output signal $S_{GF\_OUT\_2}$ before transmitting the amplified signal, in the form of the second linearity correction output signal $S_{LC\_OUT\_2}$, to the sixth addition circuit 184b, where it may be added to the second inertial force correction signal $S_{IFC\_OUT\_2}$. The sixth addition circuit 184b may then transmit the resulting sum, in the form of the second drive signal $S_{DR\_2}$, to the second driver circuit 181b.

The drive signals $S_{DR\_1}$, $S_{DR\_2}$ may then be transmitted to the actuator 115 via the driver circuits 180a, 180, respectively. Once the actuator 115 receives the drive signals $S_{DR\_1}$, $S_{DR\_2}$, it may convert each drive signals $S_{DR\_1}$, $S_{DR\_2}$ to corresponding driving forces $F_{DR\_1}$, $F_{DR\_2}$. The driving forces $F_{DR\_1}$, $F_{DR\_2}$ may then be applied to the lens 142.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A control circuit adapted to communicate with a sensor and capable of controlling an actuator of an image system, comprising:
  an input terminal configured to receive an input signal, wherein the input signal comprises an x-component, a y-component, and a z-component;
  a first circuit connected to the input terminal and configured to:
    receive the y-component and generate a first correction signal according to the y-component;
    receive the z-component and generate a second correction signal and a third correction signal according to the z-component; and
    generate a first drive signal according to the first, second, and third correction signals; and
  a second circuit connected to the input terminal and configured to:
    receive the x-component and generate a fourth correction signal according to the x-component;
    receive the z-component and generate a fifth correction signal and a sixth correction signal according to the z-component; and
    generate a second drive signal according to the fourth, fifth, and sixth correction signals.

2. The control circuit of claim 1, wherein the first circuit comprises:
  a first sub-circuit configured to:
    compute a square of the y-component; and
    generate the first correction signal according to the square of the y-component and a first correction gain;

a second sub-circuit configured to:
compute:
a square of the z-component; and
a derivative of the z-component; and
generate:
the second correction signal according to the square of the z-component and a second correction gain; and
the third correction signal according to the derivative of the z-component and a third correction gain; and
a third sub-circuit connected to the first and second sub-circuits and configured to:
receive the first, second, and third correction signals;
compute a first sum of the first, second, and third correction signals; and
generate the first drive signal according to the first sum.

3. The control circuit of claim 2, wherein the second circuit comprises:
a fourth sub-circuit configured to:
compute a square of the x-component; and
generate the fourth correction signal according to the square of the x-component and a fourth correction gain;
a fifth sub-circuit configured to generate:
the fifth correction signal according to the square of the z-component and a fifth correction gain; and
the sixth correction signal according to the derivative of the z-component and a sixth correction gain; and
a sixth sub-circuit connected to the fourth and fifth sub-circuits and configured to:
receive the fourth, fifth, and sixth correction signals;
compute a second sum of the fourth, fifth, and sixth correction signals; and
generate the second drive signal according to the second sum.

4. The control circuit of claim 3, wherein the first drive signal is equal to the first sum, and wherein the second drive signal is equal to the second sum.

5. The control circuit of claim 3, wherein each correction gain is predetermined, and wherein:
the first correction gain is determined according to a first distance between the sensor and the actuator, wherein the first distance is along an x-axis direction;
the second correction gain is determined according to a second distance between the sensor and the actuator, wherein the second distance is along the x-axis direction;
the third correction gain is determined according to a third distance between the sensor and the actuator, wherein the third distance is along a y-axis direction;
the fourth correction gain is determined according to a fourth distance between the sensor and the actuator, wherein the fourth distance is along the y-axis direction;
the fifth correction gain is determined according to a fifth distance between the sensor and the actuator, wherein the fifth distance is along the y-axis direction; and
the sixth correction gain is determined according to a sixth distance between the sensor and the actuator, wherein the sixth distance is along the x-axis direction.

6. The control circuit of claim 5, wherein:
the first correction gain is proportional to the first distance, wherein the first distance is determined according to a first relative position of the sensor with respect to the actuator;
the second correction gain is proportional to the second distance, wherein the second distance is determined according to a second relative position of the sensor with respect to the actuator;
the third correction gain is proportional to the third distance, wherein the third distance is determined according to a third relative position of the sensor with respect to the actuator;
the fourth correction gain is proportional to the fourth distance, wherein the fourth distance is determined according to a fourth relative position of the sensor with respect to the actuator;
the fifth correction gain is proportional to the fifth distance, wherein the fifth distance is determined according to a fifth relative position of the sensor with respect to the actuator; and
the sixth correction gain is proportional to the sixth distance, wherein the sixth distance is determined according to a sixth relative position of the sensor with respect to the actuator.

7. A method for driving an actuator of an image system according to a sensor, comprising:
receiving, from the sensor, an input signal comprising an x-component, a y-component, and a z-component;
generating:
a first correction signal according to the y-component;
a second correction signal and a third correction signal according to the z-component;
a fourth correction signal according to the x-component; and
a fifth correction signal and a sixth correction signal according to the z-component; and
generating:
a first drive signal according to the first, second, and third correction signals; and
a second drive signal according to fourth, fifth, and sixth correction signals.

8. The method of claim 7, wherein generating:
the first correction signal comprises:
computing a square of the y-component; and
applying a first correction gain to the square of the y-component;
the second correction signal comprises:
computing a square of the z-component; and
applying a second correction gain to the square of the z-component;
the third correction signal comprises:
computing a derivative of the z-component; and
applying a third correction gain to the derivative of the z-component;
the fourth correction signal comprises:
computing a square of the x-component; and
applying a fourth correction gain to the square of the x-component;
the fifth correction signal comprises applying a fifth correction gain to the square of the z-component; and
the sixth correction signal comprises applying a sixth correction gain to the derivative of the z-component.

9. The method of claim 8, wherein generating:
the first correction signal further comprises applying a seventh correction gain to the square of the y-component;
the second correction signal further comprises applying an eighth correction gain to the square of the z-component;

the third correction signal further comprises applying a ninth correction gain to the derivative of the z-component;

the fourth correction signal further comprises applying a tenth correction gain to the square of the x-component;

the fifth correction signal further comprises applying an eleventh correction gain to the square of the z-component; and the sixth correction signal further comprises applying a twelfth correction gain to the derivative of the z-component.

10. The method of claim 9, wherein each correction gain is predetermined, and wherein:

the first correction gain is determined according to a first distance between the sensor and the actuator, wherein the first distance is along an x-axis direction;

the second correction gain is determined according to a second distance between the sensor and the actuator, wherein the second distance is along the x-axis direction;

the third correction gain is determined according to a third distance between the sensor and the actuator, wherein the third distance is along a y-axis direction;

the fourth correction gain is determined according to a fourth distance between the sensor and the actuator, wherein the fourth distance is along the y-axis direction;

the fifth correction gain is determined according to a fifth distance between the sensor and the actuator, wherein the fifth distance is along the y-axis direction; and the sixth correction gain is determined according to a sixth distance between the sensor and the actuator, wherein the sixth distance is along the x-axis direction.

11. The method of claim 10, wherein:

the first correction gain is proportional to the first distance, wherein the first distance is determined according to a first relative position of the sensor with respect to the actuator;

the second correction gain is proportional to the second distance, wherein the second distance is determined according to a second relative position of the sensor with respect to the actuator;

the third correction gain is proportional to the third distance, wherein the third distance is determined according to a third relative position of the sensor with respect to the actuator;

the fourth correction gain is proportional to the fourth distance, wherein the fourth distance is determined according to a fourth relative position of the sensor with respect to the actuator;

the fifth correction gain is proportional to the fifth distance, wherein the fifth distance is determined according to a fifth relative position of the sensor with respect to the actuator; and the sixth correction gain is proportional to the sixth distance, wherein the sixth distance is determined according to a sixth relative position of the sensor with respect to the actuator.

12. The method of claim 7, wherein generating:

the first drive signal comprises computing a first sum of the first, second, and third correction signals; and the second drive signal comprises computing a second sum of the fourth, fifth, and sixth correction signals.

13. The method of claim 12, wherein the first drive signal is equal to the first sum, and wherein the second drive signal is equal to the second sum.

14. An image system, comprising:

a sensor configured to generate an input signal comprising an x-component, a y-component, and a z-component;

an actuator responsive to a first drive signal and a second drive signal;

a control circuit in communication with the sensor and capable of controlling the actuator, comprising:

an input terminal configured to receive the input signal;

a first circuit connected to the input terminal and configured to:

receive the y-component and generate a first correction signal according to the y-component;

receive the z-component and generate a second correction signal and a third correction signal according to the z-component; and generate the first drive signal according to the first, second, and third correction signals; and a second circuit connected to the input terminal and configured to:

receive the x-component and generate a fourth correction signal according to the x-component;

receive the z-component and generate a fifth correction signal and a sixth correction signal according to the z-component; and generate the second drive signal according to the fourth, fifth, and sixth correction signals.

15. The system of claim 14, wherein the sensor comprises at least one of a gyro sensor or an acceleration sensor.

16. The system of claim 14, wherein the first circuit is further configured to:

compute:

a square of the y-component;

a square of the z-component; and a derivative of the z-component;

generate:

the first correction signal according to the square of the y-component and a first correction gain;

the second correction signal according to the square of the z-component and a second correction gain; and the third correction signal according to the derivative of the z-component and a third correction gain;

compute a first sum of the first, second, and third correction signals; and generate the first drive signal according to the first sum.

17. The system of claim 16, wherein the second circuit is further configured to:

compute a square of the x-component;

generate:

the fourth correction signal according to the square of the x-component and a fourth correction gain;

the fifth correction signal according to the square of the z-component and a fifth correction gain; and the sixth correction signal according to the derivative of the z-component and a sixth correction gain;

compute a second sum of the fourth, fifth, and sixth correction signals; and generate the second drive signal according to the second sum.

18. The system of claim 17, wherein the first drive signal is equal to the first sum, and wherein the second drive signal is equal to the second sum.

19. The system of claim 17, wherein each correction gain is predetermined, and wherein:

the first correction gain is determined according to a first distance between the sensor and the actuator, wherein the first distance is along an x-axis direction;

the second correction gain is determined according to a second distance between the sensor and the actuator, wherein the second distance is along the x-axis direction;

the third correction gain is determined according to a third distance between the sensor and the actuator, wherein the third distance is along a y-axis direction;

the fourth correction gain is determined according to a fourth distance between the sensor and the actuator, wherein the fourth distance is along the y-axis direction;

the fifth correction gain is determined according to a fifth distance between the sensor and the actuator, wherein the fifth distance is along the y-axis direction; and the sixth correction gain is determined according to a sixth distance between the sensor and the actuator, wherein the sixth distance is along the x-axis direction.

20. The system of claim 19, wherein:

the first correction gain is proportional to the first distance, wherein the first distance is determined according to a first relative position of the sensor with respect to the actuator;

the second correction gain is proportional to the second distance, wherein the second distance is determined according to a second relative position of the sensor with respect to the actuator;

the third correction gain is proportional to the third distance, wherein the third distance is determined according to a third relative position of the sensor with respect to the actuator;

the fourth correction gain is proportional to the fourth distance, wherein the fourth distance is determined according to a fourth relative position of the sensor with respect to the actuator;

the fifth correction gain is proportional to the fifth distance, wherein the fifth distance is determined according to a fifth relative position of the sensor with respect to the actuator; and the sixth correction gain is proportional to the sixth distance, wherein the sixth distance is determined according to a sixth relative position of the sensor with respect to the actuator.

* * * * *